United States Patent
Chew et al.

(10) Patent No.: US 6,826,758 B1
(45) Date of Patent: Nov. 30, 2004

(54) METHOD AND SYSTEM FOR ACCESSING OPERATING SYSTEM RESOURCES

(75) Inventors: Chee Heng Chew, Redmond, WA (US); Neil W. Konzen, Bellevue, WA (US)

(73) Assignee: Microsoft Corporation, Redmond, MA (US)

( * ) Notice: Subject to any disclaimer, the term of this patent is extended or adjusted under 35 U.S.C. 154(b) by 1826 days.

(21) Appl. No.: 08/354,491

(22) Filed: Dec. 13, 1994

(51) Int. Cl.$^7$ .................................. G06F 9/44
(52) U.S. Cl. ........................ 719/328; 345/700
(58) Field of Search ..................... 395/682, 700; 719/328, 329; 345/700

(56) References Cited

PUBLICATIONS

Cowart, Robert, "Mastering Windows™ 3.1", SYBEX, p. 639, 1993.*
Heller, Martin, "When the Fat Lady Finally Sings" Windows Magazine, n 51, p. 357, Nov. 1994.*
Cowart, Robert, "Mastering Windows™ 3.1", SYBEX, pp. 1–964, 1993.*
Petzold, C., *Programming Windows 3.1*, 3d ed., Microsoft Press, 1992.
*Microsoft Windows 3.1 Guide to Programming*, Microsoft Press, 1992, Ch. 8 (pp. 163–188).

* cited by examiner

Primary Examiner—St. John Courtenay, III
(74) Attorney, Agent, or Firm—Klarquist Sparkman, LLP

(57) ABSTRACT

An operating system includes APIs developed in part to support recent innovations in computer hardware and in part to provide enhanced services to application programs. Among their other features, these APIs provide access to operating system functionality in a manner that is comprehensive, efficient, usable, extendible and, in some cases, reusable.

10 Claims, 2 Drawing Sheets

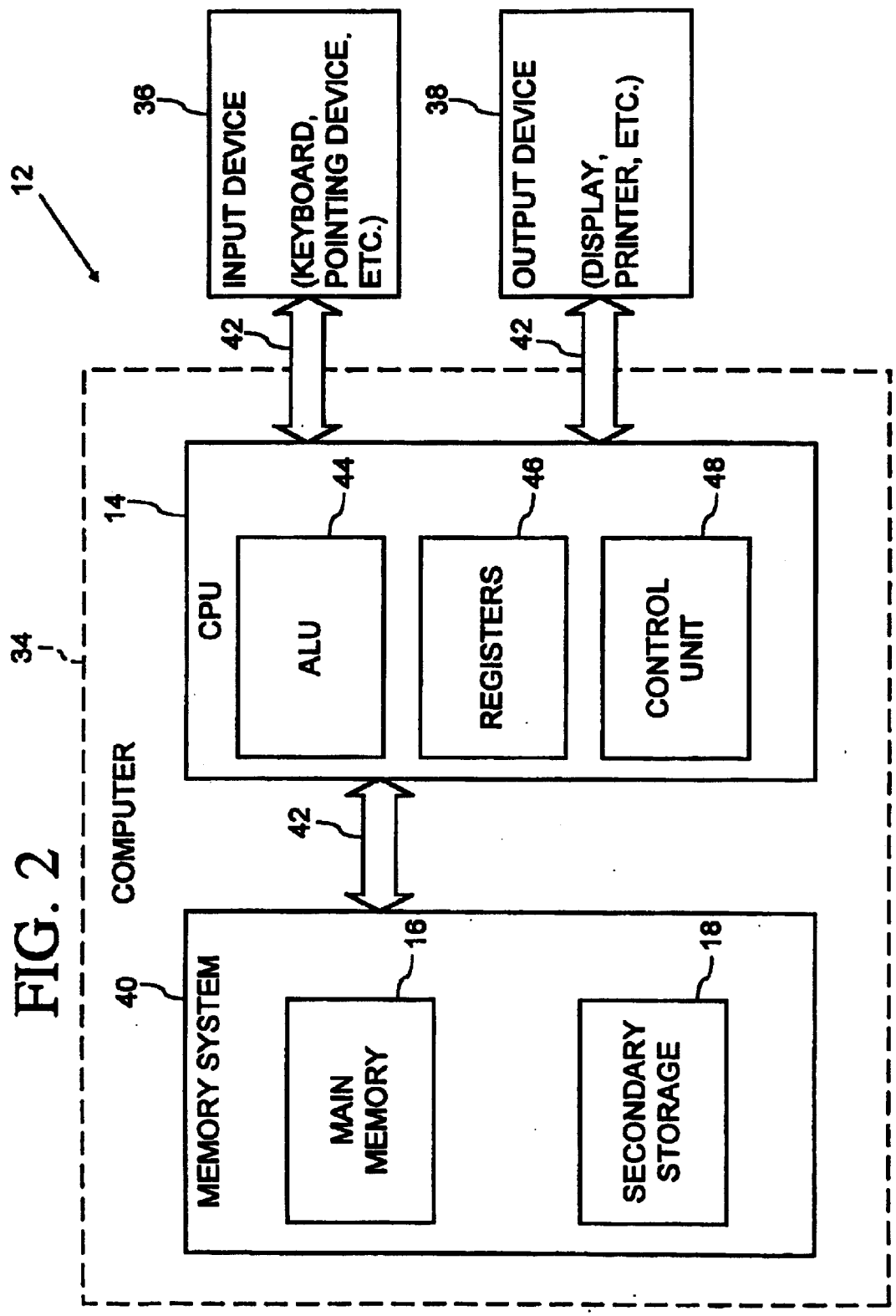

METHOD AND SYSTEM FOR ACCESSING OPERATING SYSTEM RESOURCES

FIELD OF THE INVENTION

The present invention relates to computer software development, and more particularly relates to application program interfaces (APIs) that facilitate use of operating system resources by application programs and computer hardware.

BACKGROUND AND SUMMARY OF THE INVENTION

The field of software development has undergone substantial evolution in the 50 years since its inception. An early form of software simply abstracted and represented hardware functions in a "human readable" form known as assembly language code. Special purpose application programs could then be written in such code to command the computer to perform an organized set of operations.

Assembly language coding has several drawbacks. One is that the code required to carry out a particular function has to be specifically included in each program needing that function: dozens of software developers might write code (or at least copy code) for a single function dozens of times for dozens of programs. A second drawback to assembly language coding is that programmers must understand the computer's internal hardware resources: as hardware is changed, so must the programmers' software programs.

To address these and other difficulties, the software necessary to operate a computer was soon split into two classes: operating system software, and applications software.

Operating system software (sometimes termed simply "the operating system") is a set of computer code that performs a variety of functions, including interacting with the computer hardware; insulating the programmer from the specifics of the computer hardware; and providing general functionality ("resources") that many application programs require.

Applications software (sometimes terms "applications"), in contrast, addresses a particular problem to be solved. Examples of applications software are word processors and accounting programs. Applications software and operating systems communicate using a series of standardized instruction codes passed between the two. The operating system software interprets these standardized instruction codes, and controls the computer's hardware resources in response thereto. Oftentimes, information in the form of data or messages is passed back to the applications software. In this manner, the operating system software—once written—effects most direct control of the hardware, allowing the application software programmer to focus on the particular problem sought to be solved. (Alternatively, application software can still include assembly language code—directly controlling the computer hardware and bypassing the operating system. This may be done for speed or control, or simply to provide functionality not supported by the operating system.)

The relationship between operating system software, applications software and hardware is not always clearly defined. Over the last several decades, each has evolved rapidly. As was noted above, operating systems sometimes evolve to include functions common to several applications. Similarly, operating systems are sometimes modified to include functionality previously provided only in hardware and visa-versa. For example, data compression can be done in software (by an operating system or application) and in hardware (by a specialized chip). Essentially, the three technologies have developed together in response to user demand and advances in technology.

A specific factor driving the evolution of operating system software has been the desire to simplify and speed application software development. Application software development can be a daunting task, sometimes requiring hundreds of man-years of effort for a sophisticated program. For a popular operating system such as Microsoft® Windows™, applications software developers may write thousands of different applications each year to execute on the Windows operating system. The investment in application development time is large. One incentive to create such programs is to provide good support for the application software through the operating system. This requires building a coherent and usable base for applications developers to work with.

Often, development of application software can be made simpler by making the operating system more complex. That is (as noted above), if a function may be useful to several different application programs, it is better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Another factor driving the continuing evolution of operating system software is the ongoing development of faster and more sophisticated computer hardware—both in the computer's central processing unit (CPU) and in its peripheral devices (e.g. printers). New CPUs typically offer enhanced instruction sets that enable certain new operations to be performed, or enable old operations to be performed more quickly. Corresponding enhancements are usually made to the operating system to afford applications access to these new CPU capabilities.

The relationship between operating systems and hardware has also driven the development of a special class of software: device drivers. Peripheral devices usually do not communicate directly with the operating system. Instead, such devices usually communicate with device driver software, which in turn communicate with the operating system. A device driver thus serves as a software interface between operating system software and peripheral device hardware. The specific requirements of a particular hardware device are often handled by the device driver, making the details transparent to the operating system. A computer system typically employs many different device drivers, e.g. one for the display, one for the printer, one for the mouse, etc.

Often, a new peripheral device can be supported just by writing a new device driver tailored to exploit its hardware; no revision to the operating system is required as long as the operating system recognizes and can communicate with the device driver. Sometimes, however, significant gains in functionality and efficiency can be achieved by upgrading an operating system's facilities for interacting with device drivers (and thus with the peripheral hardware).

It is clear that for a useful and accomplished operating system, the interfaces between the operating system and the computer hardware and application software are as important as efficient internal operation of the operating system itself.

The present invention is directed to improvements in computer operating systems. In particular, the invention concerns certain Applications Program Interfaces (APIs). APIs are mechanisms by which applications software can request services from the operating system, including certain hardware operations and access to various operating system resources. APIs also serve as the means by which messages and information provided by the operating system are relayed back to the applications software for its use. (Device drivers sometimes make use of operating system APIs as well. For expository convenience, the present specification refers to software that makes use of APIs simply as "applications software"—it being understood that this usage encompasses device drivers as well.)

The evolution of APIs tracks that of computers generally. The first operating systems provided only limited collections of APIs, which were actually more in the nature of user (operator) interfaces (e.g. Print Screen) than application interfaces. As the functionality provided by computers via operating systems increased, so did the number of APIs available to access this increased functionality.

Generally, operating systems are developed for use with a specific CPU. Thereafter, the operating system can be used on any computer that uses that or a compatible CPU, regardless of which manufacturer produced the computer, or minor idiosyncrasies in its design.

Likewise, application programs are generally developed for use with a specific operating system. To the extent that two operating systems support the same API sets, an application program is "portable" and can be executed on either system.

Contemporary operating systems are provided with rich sets of APIs—sometimes numbering in the hundreds of operating system calls and responsive messages—greatly facilitating the task of the application software development.

When implementing an API set for a new operating system or function, the straightforward approach is to write an API for each operating system function or resource that may be required by an application program or hardware device. More commonly, however, operating system APIs are developed in the process of enhancing an existing operating system. In this context, the straightforward approach is to take the predecessor operating system's API set and make use of those APIs whenever possible in the new operating system. The prior APIs can be patched or extended, where necessary, to take advantage of—for example—new hardware capabilities.

The foregoing design philosophies may be characterized largely as rote: i.e. following old ways, with old calls, old formats, and old parameters. Technically superior operating systems distinguish themselves by inventiveness beyond the rote. Invention in the interface can manifest itself in many ways: breaking out of the comfort of the old in favor of a new or unfamiliar approach; devising new operating system functions from the feature set of old CPU hardware; making existing operating system functions available in a more meaningful or efficient manner (with the same hardware); anticipating application program and hardware component needs not yet felt and laying groundwork to facilitate their eventual support, etc.

The APIs detailed in the present application are those for the Microsoft® Windows 95™ (earlier known as Chicago) operating system. These APIs were developed in part to support recent innovations in computer hardware, and in part to provide enhanced services to application programs.

As those skilled in the art will recognize, the Windows 95 APIs reflect many inventive improvements over those of its predecessor operating systems—not just in terms of raw functionality provided by the improved operating system, but also in the manner the enhanced functionality of the Windows 95 operating system is made available for use by application programs and hardware components. Among their other features, these APIs provide access to the Windows 95 operating system functionality in a manner that is comprehensive, efficient, usable, extendible and, in some cases, reusable.

The foregoing and additional features of the present invention will be more readily apparent from the following detailed description, which proceeds with reference to the accompanying drawings.

DESCRIPTION OF THE DRAWINGS

FIG. 2 is a block diagram of a computer with which the present invention can be utilized.

DETAILED DESCRIPTION

Figure 1:
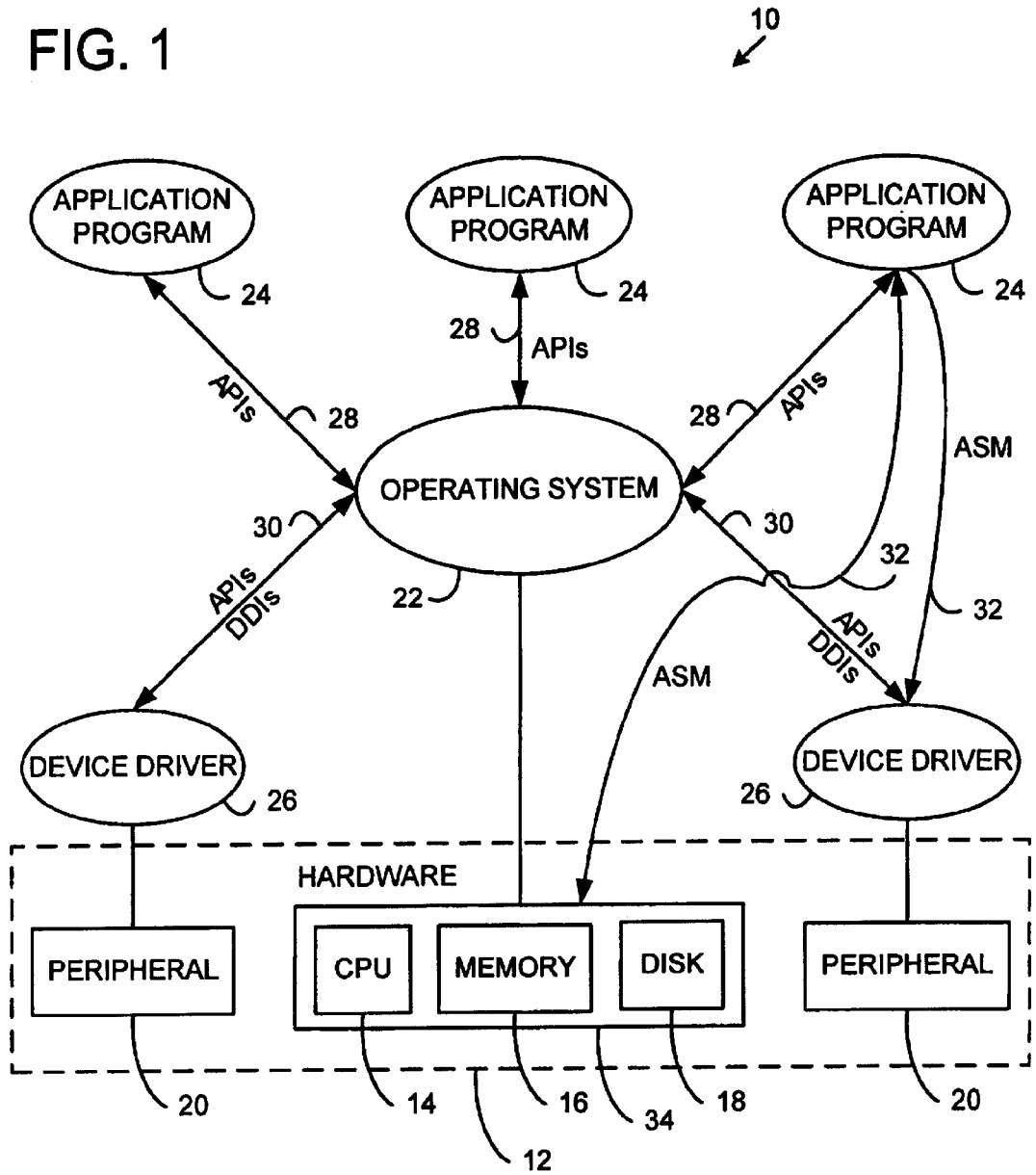
FIG. 1 shows relationships between different types of computer software.

In the Microsoft Windows family of operating systems (as in many operating systems from other vendors), the "window" is a central feature. To the user, it is the visual feature through which all interaction—both with applications and with the operating system—occurs. On a software level, it is the "object" through which most control/communication between the operating system and an application occurs.

Rudimentary to windows are icons. Icons are small bit maps that can be used for a variety of purposes, one of the most familiar of which is to represent Windows application programs that are available for execution. It is not unusual for a dozen or more icons to be displayed in a window.

The Windows 95 operating system includes a variety of new APIs and functions that facilitate display of icons (and other bitmaps) in windows. While such functionality could, to some degree, be achieved in prior versions of the Windows operating system, the APIs of the present invention provide significant advantages, including efficiencies in coding of application programs and faster execution.

In Windows 95, windows are created in generally the same manner as in predecessor versions of the Windows operating system, namely by use of the CreateWindow API. One of the parameters passed during invocation of this function is the window "class." In Windows 95, a new class of window has been defined, termed "list view control" (or simply "list view"). To create a list view window, CreateWindow is invoked with a specification of "WC_LISTVIEW" as the window class. (The list view window class is registered in the application's address space when the common controls dynamic-link library (DLL) is loaded.)

By requesting creation of a window of the "list view" class, the application programmer can use a rich set of new controls in displaying, arranging, and manipulating bit maps in the window. (The bit maps can, but need not, be icons.)

After creation, or manipulation, the application programmer can request that the window be presented on the screen by use of standard Windows operating system functions, e.g. the ShowWindow API.

The foregoing will be clearer from the following detailed analysis of the Windows 95 List View Controls, which is taken from documentation provided to software developers to enable them to use these new APIs, macros, and functions.
About List View Controls A list view control is a window that displays a collection of items, each item consisting of an icon and a label. List views provide several ways of arranging items and displaying individual items. For example, additional information about each item can be displayed in columns to the right of the icon and label.

The application programmer can create a list view control by calling the CreateWindow or CreateWindowEx function, specifying the WC_LISTVIEW window class. This window class is registered when the common controls dynamic-link library (DLL) is loaded. To ensure that this DLL is loaded, the application programmer can use the InitCommonControls function.

An application sends messages to a list view control to add, remove, arrange, and otherwise manipulate items. Each message has a macro that the application programmer can use instead of sending the message explicitly.

Like most common controls, a list view control sends notification messages to its parent window in the form of WM_NOTIFY messages.

Views and Styles

List view controls can display their contents in four different ways, called views. The current view is specified by the control's window style. Additional window styles specify the alignment of items and control-specific aspects of the list view control's functionality. Information about the four views follows.

| View | Description |
| --- | --- |
| Icon view | Specified by the LVS_ICON window style. Each item appears as a full-sized icon with a label below it. The user can drag the items to any location in the list view window. |
| Small icon view | Specified by the LVS_SMALLICON window style. Each item appears as a small icon with the label to the right of it. The user can drag the items to any location. |
| List view | Specified by the LVS_LIST window style. Each item appears as a small icon with a label to the right of it. Items are arranged in columns and cannot be dragged to any arbitrary location by the user. |
| Report view | Specified by the LVS_REPORT window style. Each item appears on its own line with information arranged in columns. The leftmost column contains the small icon and label, and subsequent columns contain subitems as specified by the application. Unless the LVS_NOCOLUMNHEADER window style is also specified, each column has a header. |

The application programmer can change the view type after a list view control is created. To retrieve and change the window style, use the GetWindowLong and SetWindowLong functions. To isolate the window styles that correspond to the current view, use the LVS_TYPEMASK value.

The application programmer can control the way items are arranged in icon or small icon view by specifying one of the following window styles: LVS_ALIGNTOP (the default style), LVS_ALIGNBOTTOM, LVS_ALIGNLEFT, or LVS_ALIGNRIGHT. The application programmer can change the alignment after a list view control is created. To isolate the window styles that specify the alignment of items, use the LVS_ALIGNMASK value.

Additional window styles control other options—for example, whether a user can edit labels in place, whether more than one item can be selected at a time, and so on.

List View Image Lists

The icons for list view items are contained in image lists, which the application programmer creates and assigns to the list view control. One image list contains the full-sized icons used in icon view, and a separate image list contains smaller versions of the same icons for use in other views. The application programmer can also specify a third image list that contains state images, which are displayed next to an item's icon to indicate an application defined state.

The application programmer assigns an image list to a list view control by using the LVM_SETIMAGELIST message, specifying whether the image list contains large icons, small icons, or state images. The application programmer can use the GetSystemMetrics function to determine appropriate dimensions for large and small icons, and the ImageList_Create function to create the image lists. For more information about image lists, see the discussion in documents CCTL32_1.DOC, CCTL32_2.DOC, DOC2.DOC and WIN32UPD.DOC in the SDK/DDK documentation published by Microsoft on Oct. 28, 1994 (copy available in the application file).

The application programmer can retrieve the handle of an image list currently assigned to a list view control by using the LVM_GETIMAGELIST message.

The large and small icon image lists typically contain icons for each type of list view item. The application programmer need not create both of these image lists if only one is used—for example, if a list view control is never in icon view. If the application programmer creates both image lists, they must contain the same images in the same order because a single value is used to identify a list view item's icon in both image lists.

The large and small icon image lists can also contain overlay images, which are designed to be superimposed on item icons. A nonzero value in bits 8 through 11 of a list view item's state specifies the one-based index of an overlay image (zero indicates no overlay image). Because a 4bit, one-based index is used, overlay images must be among the first 15 images in the image lists. For more information about list view item states, see the discussion of "Item States" in documents CCTL32_1.DOC, CCTL32_2.DOC, DOC2.DOC and USER32_3.DOC in the cited SDK/DDK documentation If a state image list is specified, a list view control reserves space to the left of each item's icon for a state image. An application can use state images, such as checked and cleared check boxes, to indicate application-defined item states. A nonzero value in bits 12 through 15 specifies the one-based index of a state image (zero indicates no state image). State images are typically not used in icon view.

By default, a list view control destroys the image lists assigned to it when it is destroyed. If a list view control has the LVS_SHAREIMAGELISTS window style, however, the application is responsible for destroying the image lists when they are no longer in use. The application programmer should specify this style if he or she assigns the same image lists to multiple list view controls; otherwise, more than one control might try to destroy the same image list.

Items and SubItems

Each item in a list view control consists of an icon, a label, a current state, and an application-defined value. One or more subitems can also be associated with each item. A subitem is a string that, in report view, can be displayed in a column to the right of an item's icon and label. All items in a list view have the same number of subitems. By using list view messages, the application programmer can add, modify, retrieve information about, and delete items. The application programmer can also find items with specific attributes.

The LV_ITEM structure defines a list view item or subitem. The iItem member is the zero-based index of the item. The iSubItem member is the one-based index of a subitem, or zero if the structure contains information about an item. Additional members specify the item's text, icon, state, and item data. Item data is an application-defined value associated with a list view item.

To add an item to a list view control, use the LVM_INSERTITEM message, specifying the address of an LV_ITEM structure. Before adding multiple items, the application programmer can send the control an LVM_SETITEMCOUNT message, specifying the number of items the control will ultimately contain. This message enables the list view control to reallocate its internal data structures only once rather than every time the application programmer adds an item. The application programmer can determine the number of items in a list view control by using the LVM_GETITEMCOUNT message.

To change the attributes of a list view item, use the LVM_SETITEM message, specifying the address of an LV_ITEM structure. The mask member of this structure specifies the item attributes the application programmer wants to change. To change only the text of an item or subitem, use the LVM_SETITEMTEXT message.

To retrieve information about a list view item, use the LVM_GETITEM message, specifying the address of the LV_ITEM structure to fill in. The mask member specifies the item attributes to retrieve. To retrieve only an item or subitem's text, the application programmer can use the LVM_GETITEMTEXT message.

To delete a list view item, use the LVM_DELETEITEM message. The application programmer can delete all items in a list view control by using the LVM_DELETEALLITEMS message.

Item States

An item's state is a value that specifies the item's availability, indicates user actions, or otherwise reflects the item's status. A list view control changes some state bits, such as when the user selects an item. An application might change other state bits to disable or hide the item, or to specify an overlay image or state image. For more information about overlay images and state images, see "List View Image Lists," above.

An item's state is specified by the state member of the LV_ITEM structure. When the application programmer specifies or changes an item's state, the stateMask member specifies which state bits the application programmer wants to change. The application programmer can change an item's state by using the LVM_SETITEMSTATE message. The application programmer can specify an item's state when the application programmer creates it or when he or she changes its attributes by using the LMV_SETITEM message. To determine an item's current state, use the LVM_GETITEMSTATE or LVM_GETITEM message.

To set an item's overlay image, the stateMask member of the LV_ITEM structure must include the LVIS_OVERLAYMASK value, and the state member must include the one-based index of the overlay image shifted left 8 bits by using the INDEXTOOVERLAYMASK macro. The index can be zero to specify no overlay image.

To set an item's state image, the stateMask member of the LV_ITEM structure must include the LVIS_STATEIMAGEMASK value, and the state member must include the one-based index of the state image shifted left 12 bits by using the INDEXTOSTATEIMAGEMASK macro. The index can be zero to specify no state image.

Callback Items and the Callback Mask

A callback item is a list view item for which the application—rather than the control—stores the text, icon, or both. Although a list view control can store these attributes, the application programmer may want to use callback items if the application already maintains some of this information. The callback mask specifies which item state bits are maintained by the application, and it applies to the whole control rather than to a specific item. The callback mask is zero by default, meaning that the control tracks all item states. If an application uses callback items or specifies a nonzero callback mask, it must be able to supply list view item attributes on demand.

A list view control requests any information it needs to display an item by sending its owner window an LVN_GETDISPINFO notification message. The specified LV_DISPINFO structure identifies the item or subitem and indicates which attributes the application must supply. If item attributes or state bits that are maintained by the application change, the list view control sends its owner window an LVN_SETDISPINFO notification message. This notification enables the application to update its information.

If the application programmer changes a callback item's attributes, the application programmer can use the LVM_UPDATE message to force the control to repaint the item. This message also arranges the list view control if it has the LVS_AUTOARRANGE style. The application programmer can use the LVM_REDRAWITEMS message to redraw a range of items by invalidating the corresponding portions of the list view's client area.

The application programmer can define a callback item by specifying appropriate values for the pszText and iImage members of the LV_ITEM structure. If the application maintains the item's or subitem's text, specify the LPSTR_TEXTCALLBACK value for the pszText member. If the application keeps track of the icon for the item, specify the I_IMAGECALLBACK value for the iImage member.

To set the callback mask for a list view control, use the LVM_SETCALLBACKMASK message. A one bit in the callback mask means the application maintains the corresponding state bit for each list view item. To get the current callback mask, use the LVM_GETCALLBACKMASK message.

By effectively using callback items and the callback mask, the application programmer can ensure that each item attribute is maintained in only one place. Doing this can simplify the application, but the only space saved is the memory that would otherwise be required to store item labels and subitem text.

The application programmer can save a more significant amount of memory by creating a list view control with the LVS_NOITEMDATA window style. A list view control with this style keeps track of the number of items it contains, but it does not save any information about each item. In effect, every item is a callback item. However, the application programmer must observe the following limitations when using LVS_NOITEMDATA:

The control must be in report view. No other views can be used because the control does not save the position of each item.

Label editing is not possible.

Item data cannot be assigned to list view items.

Item states cannot be set. The control does not maintain item state information; it uses a different mechanism to keep track of selected items and other states. However, the application programmer can work around this by setting the callback mask.

Columns

Columns control the way items and their subitems are displayed in report view. Each column has a title and width, and it is associated with a specific subitem (subitem zero is the item's icon and label). The attributes of a column are defined by an LV_COLUMN structure.

To add a column to a list view control, use the LVM_INSERTCOLUMN message. To delete a column, use the LVM_DELETECOLUMN message. The application programmer can retrieve and change the properties of an existing column by using the LVM_GETCOLUMN and LVM_SETCOLUMN messages.

To retrieve or change a column's width, use the LVM_GETCOLUMNWIDTH and LVM_SETCOLUMNWIDTH messages. The application programmer can determine the minimum column width necessary to display all of a string by using the LVM_GETSTRINGWIDTH message.

Unless the LVS_NOCOLUMNHEADER window style is specified, column headers appear in report view. The user can click a column header, causing an LVN_COLUMNCLICK notification message to be sent to the parent window. Typically, the parent window sorts the list view by the specified column when this occurs. The user can also drag the column guides between the headers to size the columns.

Arranging, Sorting, Finding

The application programmer can use list view messages to arrange and sort items and to find items based on their attributes or positions. Arranging repositions items to align on a grid, but the indexes of the items do not change. Sorting changes the sequence of items (and their corresponding indexes) and then repositions them accordingly. The application programmer can arrange items only in icon and small icon views, but the application programmer can sort items in any view.

To arrange items, use the LVM_ARRANGE message. The application programmer can ensure that items are arranged at all times by specifying the LVS_AUTOARRANGE window style.

To sort items, use the LVM_SORTITEMS message. When the application programmer sorts using this message, the application programmer specifies an application-defined callback function that is called to compare the relative order of any two items. By supplying an appropriate comparison function, the application programmer can sort items by their label by any subitem, or by any other property. Note that sorting items does not reorder the corresponding subitems. Thus, if any subitems are not callback items, the application programmer must regenerate the subitems after sorting.

The application programmer can ensure that a list view control is always sorted by specifying the LVS_SORTASCENDING or LVS_SORTDESCENDING window style. The application programmer cannot supply a comparison function when using these window styles. The list view sorts the items in ascending or descending order by label.

The application programmer can find a list view item with specific properties by using the LVM_FINDITEM message. The application programmer can find a list view item that is in a specified state and bears a specified geometrical relationship to a given item by using the LVM_GETNEXTITEM message. For example, the application programmer can retrieve the next selected item to the right of a specified item.

Item Position

Every list view item has a position and size, which the application programmer can retrieve and set using messages. The application programmer can also determine which item, if any, is at a specified position. The position of list view items is specified in view coordinates, which are client coordinates offset by the scroll position.

To retrieve and set an item's position, use the LVM_GETITEMPOSITION and LVM_SETITEMPOSITION messages. LVM_GETITEMPOSITION works for all views, but LVM_SETITEMPOSITION works only for icon and small icon views.

The application programmer can determine which item, if any, is at a particular location by using the LVM_HITTEST message.

To get the bounding rectangles for a list item or for only its icon or label, use the LVM_GETITEMRECT message.

Scroll Position

Unless the LVS_NOSCROLL window style is specified, a list view control can be scrolled to show more items than can fit in the client area of the control. The application programmer can get a list view's scroll position and related information, scroll a list view by a specified amount, or scroll a list view such that a specified list item is visible.

In icon view or small icon view, the current scroll position is defined by the view origin. The view origin is the set of coordinates, relative to the visible area of the list view, that correspond to the view coordinates (0, 0). To get the current view origin, use the LVM_GETORIGIN message. This message should be used only in icon or small icon view; it returns an error in list or report view.

In list view or report view, the current scroll position is defined by the top index. The top index is the index of the first visible item in the list view control. To get the current top index, use the LVM_GETTOPINDEX message. This message returns a valid result only in list or report view; it returns zero in icon or small icon view.

The application programmer can use the LVM_GETVIEWRECT message to get the bounding rectangle of all items in a list view control, relative to the visible area of the list view.

The LVM_GETCOUNTPERPAGE message returns the number of items that fit in one page of the list view. This message returns a valid result only in list control and report views; in icon and small icon views, it returns, the total number of items.

To scroll a list view control by a specific amount, use the LVM_SCROLL message. Using the LVM_ENSUREVISIBLE message, the application programmer can scroll the list view, if necessary, to ensure that a specified item is visible.

Label Editing

A list view control that has the LVS_EDITLABELS window style enables a user to edit item labels in place. The user begins editing by clicking the label of an item that has the focus. An application can begin editing automatically by using the LVM_EDITLABEL message. The list view control notifies the parent window when editing begins and when it is canceled or completed. When editing is completed, the parent window is responsible for updating the item's label, if appropriate.

When label editing begins, a list view control sends its parent window an LVN_BEGINLABELEDIT notification message. The application programmer can process this message to allow selective editing of specific labels; returning a nonzero value prevents label editing.

When label editing is canceled or completed, a list view control sends its parent window an LVN_ENDLABELEDIT notification message. The lParam parameter is the address of an LV_DISPINFO structure identifying the item and specifying the edited text. The parent window is responsible for updating the item's label, if appropriate, perhaps after validating the edited string. The iItem member is −1 if editing is canceled.

During label editing, the application programmer can get the handle of the edit control used for label editing by using the LVM_GETEDITCONTROL message. To limit the amount of text a user can enter, send the edit control an EM_LIMITTEXT message. The application programmer can even subclass the edit control to intercept and discard invalid characters. The edit control is created after the LVN_BEGINLABELEDIT notification message is sent.

List View Colors

An application can retrieve and set three colors for a list view control. To retrieve and set the text color, use the LVM_GETTEXTCOLOR and LVM_SETTEXTCOLOR messages. To retrieve and set the text background color, use the LVM_GETTEXTBKCOLOR and LVM_SETTEXTBKCOLOR messages. To retrieve and set the window background color, use the LVM_GETBKCOLOR and LVM_SETBKCOLOR messages.

Notification Messages

A list view control sends notification messages to its parent window in the form of WM_NOTIFY messages. The following table summaries the notification messages sent by a list view control.

| Notification message | Description |
| --- | --- |
| LVN_BEGINDRAG | Signals the start of a drag-and-drop operation. |
| LVN_BEGINLABELEDIT | Signals the start of in-place label editing. |
| LVN_BEGINRDRAG | Signals the start of a drag-and-drop operation, using the right mouse button. |
| LVN_COLUMNCLICK | Indicates that the user clicked a column header in report view. |
| LVN_DELETEALLITEMS | Signals the deletion of all list view items. |
| LVN_DELETEITEM | Signals the deletion of a specific item. |
| LVN_ENDDRAG | Signals the end of a drag-and-drop operation that was handled by the list view control rather than its parent window. |
| LVN_ENDLABELEDIT | Signals the end of label editing. |
| LVN_ENDRDRAG | Signals the end of a drag-and-drop operation, using the right mouse button, that was handled by the list view control. |
| LVN_GETDISPINFO | Requests information that the list view control requires to display an item. |
| LVN_INSERTITEM | Signals the insertion of a new list view item. |
| LVN_ITEMCHANGED | Indicates that an item has changed. |
| LVN_ITEMCHANGING | Indicates that an item is in the process of changing, and enables the parent window to accept or deny the change. |
| LVN_KEYDOWN | Signals a keyboard event. |
| LVN_SETDISPINFO | Notifies a parent window that it must update the information it maintains for an item. |

Default Message Processing

The following table summarizes the message processing performed by a list view control. Messages specific to list view controls are discussed elsewhere and are, therefore, not included here.

| Message | Processing performed |
| --- | --- |
| WM_CHAR | Searches for a list view item that begins with the specified character and, if found, selects and sets the focus to the item. Multiple characters received within a time-out interval are concatenated, and the list view searches for an item that begins with the resulting string. |
| WM_COMMAND | Processes the EN_UPDATE and EN_KILLFOCUS edit control notification messages, and forwards all other edit control notifications to the parent window. |
| WM_CREATE | Performs additional initialization. If the LVS_SHAREIMAGELISTS window style is not specified, the list view control creates the icon and small icon image lists at this point. |
| WM_DESTROY | Frees resources. |
| WM_ERASEBKGND | Erases the window background using the current background color for the list view control. If the background color is the CLR_NONE value, the list view control forwards the message to the parent window. |
| WM_GETDLGCODE | Returns a combination of the DLGC_WANTTAB and DLGC_WANTARROWS values. |
| WM_GETFONT | Returns the handle of the current label font. |
| WM_HSCROLL | Scrolls the list view horizontally. |
| WM_KEYDOWN | Processes the SPACEBAR, ENTER, and arrow keys, and sends a LVN_KEYDOWN notification message to the parent window. |
| WM_KILLFOCUS | Repaints the focused list item, if any, and sends a NM_KILLFOCUS notification message to the parent window. |
| WM_LBUTTONDBLCLK | Sends the parent window an NM_DBLCLK notification message. |
| WM_LBUTTONDOWN | Processed in different ways depending on whether a click or drag operation is being initiated. To determine which operation is involved, the control enters a modal message loop until either the button is released or the mouse is moved. In the case of a click, the control may change which item has the focus and which items are selected, taking into account the cursor position, the state of the SHIFT and CTRL keys, and so on. Then the list view control sends its parent window an NM_CLICK notification message. If dragging begins over an item, the control selects and sets the focus to the item. Then it sends an LVN_BEGINDRAG notification message to the parent window. The parent window is responsible for actually carrying out the drag operation. If dragging begins over the window background, the control enters another modal message loop, enabling the user to form a rectangle by dragging the mouse. Items within the rectangle are selected. |
| WM_NCCREATE | Allocates and initializes an internal data structure, and then calls the DefWindowProc function. |
| WM_NCDESTROY | Frees resources allocated by the list view control. Unless the LVS_SHAREIMAGELISTS style is used, this includes deleting the image list and small image list. |
| WM_NOTIFY | Processes header control notification messages. |
| WM_PAINT | Displays any items in the update region. For callback items, the control first sends an LVN_GETDISPINFO notification message to the owner window to request display information. |
| WM_RBUTTONDOWN | Processed the same way as the WM_LBUTTONDOWN message, except that the control sends an NM_RCLICK notification message (instead of NM_CLICK) and an LVN_BEGINRDRAG notification message (instead of LVN_BEGINDRAG). |
| WM_SETFOCUS | Repaints the focused list item, if any, and sends an NM_SETFOCUS notification message to the parent window. |
| WM_SETFONT | Saves the specified font handle, forwards the message to the header window, if any, and repaints using the new font. |
| WM_SETREDRAW | Turns redrawing on or off. |
| WM_TIMER | Begins editing of an item label. If the user clicks the label of the focused item, the list |

-continued

| Message | Processing performed |
|---|---|
| | view control sets a timer instead of entering edit mode immediately. The timer makes it possible for the control to not enter edit mode if the user double-clicks the label. |
| WM_VSCROLL | Scrolls the list view vertically. |
| WM_WINDOWPOSCHANGED | Updates the window scroll bars. If the current view is icon or small icon view and the LVS_AUTOARRANGE style is specified, the list view control also arranges the list items. |
| WM_WININICHANGE | Processes changes to system metrics. |

Using List View Controls

This section contains examples demonstrating how to perform the following tasks:
Create a list view control and initialize its image lists.
Add columns and items to the control.
Process notification messages from the control.
Change list view styles.

Creating a List View Control

To create a list view control, use the CreateWindow or CreateWindowEx function, specifying the WC_LISTVIEW window class. The list view window class is registered in the application's address space when the common controls dynamic-link library (DLL) is loaded. The application programmer can ensure that the DLL is loaded by using the InitCommonControls function.

The following example creates a list view control and then calls application-defined functions that add image lists, columns, and list view items. The window style specifies the control's initial view and other options. This example specifies report view, which enables the user to edit the labels of list view items.

```
// CreateListView - creates a list view control.
// Returns the handle of the new control if successful or NULL
//    otherwise.
// hwndParent - handle of the control's parent window
// pfData - file containing list view items
HWND WINAPI CreateListView(HWND hwndParent, FILE *pfData)
{
    HWND hwndLV;
    // Force the common controls DLL to be loaded.
    InitCommonControls();
    // Create the list view window.
    hwndLV = CreateWindow(WC_LISTVIEW, "",
        WS_CHILD | LVS_REPORT | LVS_EDITLABELS,
        0, 0, CW_USEDEFAULT, CW_USEDEFAULT,
        hwndParent, NULL, g_hinst, NULL);
    if (hwndLV == NULL)
        return NULL;
    // Call application-defined functions to initialize the
    // image lists, add columns, and add some items.
    if (!InitListViewImageLists(hwndLV) ||
            !InitListViewColumns(hwndLV) ||
            !InitListViewItems(hwndLV, pfData)) {
        DestroyWindow(hwndLV);
        return FALSE;
    }
    return hwndLV;       // return the control's handle
}
```

Initializing the Image Lists for a List View

A list view control can have up to three image lists associated with it: one for item icons in large icon view, one for item icons in other views, and one for application-defined item states. The following example creates two image lists, adds an icon to each, and assigns them to a list view control by using the LVM_SETIMAGELIST message.

```
// InitListViewImageList - creates image lists for a list view.
// Returns TRUE if successful or FALSE otherwise.
// hwndLV - handle of the list view control
BOOL WINAPI InitListViewImageLists(HWND hwndLV)
{
    HICON hiconItem;              // icon for list view items
    HIMAGELIST himlLarge;         // image list for icon view
    HIMAGELIST himlSmall;         // image list for other views
    // Create the large and small icon image lists.
    himlLarge = ImageList_Create(GetSystemMetrics(SM_CXICON),
        GetSystemMetrics(SM_CYICON), TRUE, 1, 1);
    himlSmall = ImageList_Create(GetSystemMetrics(SM_CXSMICON),
        GetSystemMetrics(SM_CYSMICON), TRUE, 1, 1);
    // Add an icon to each image list.
    hiconItem = LoadIcon(g_hinst, MAKEINTRESOURCE(IDI_ITEM));
    ImageList_AddIcon(himlLarge, hiconItem);
    ImageList_AddIcon(himlSmall, hiconItem);
    DeleteObject(hiconItem);
    // Assign the image lists to the list view control.
    ListView_SetImageList(hwndLV, himlLarge, LVSIL_NORMAL);
    ListView_SetImageList(hwndLV, himlSmall, LVSIL_SMALL);
    return TRUE;
}
```

Adding Columns to a List View

Columns appear only in report view, and they enable multiple pieces of information to be displayed for each list item. The application programmer can add columns to a list view control by using the LVM_INSERTCOLUMN message. Each item in a list view can have, in addition to its item text, any number of strings called subitems. When the application programmer adds a column to a list view, he or she specifies which subitem to display in the column.

Unless a list view has the LVS_NOCOLUMNHEADER window style, each column has a header showing the column name. The user can click the header and can size the columns using the header.

The following example adds several columns to a list view control. The column headings are defined as string resources, which are consecutively numbered starting with IDS_FIRSTCOLUMN (defined in the application's header file). The number of columns is defined in the application's header file as C_COLUMNS.

```
// InitListViewColumns - adds columns to a list view control.
// Returns TRUE if successful or FALSE otherwise.
// hwndLV - handle of the list view control
BOOL WINAPI InitListViewColumns(HWND hwndLV)
{
    extern char g_achTemp[256];   // temporary buffer
    LV_COLUMN lvc;
    int iCol;
    // Initialize the LV_COLUMN structure.
    lvc.mask = LVCF_FMT | LVCF_WIDTH | LVCF_TEXT | LVCF_SUBITEM;
    lvc.fmt = LVCFMT_LEFT;
    lvc.cx = 100;
    lvc.pszText = g_achTemp;
    // Add the columns.
    for (iCol = 0; iCol < C_COLUMNS; iCol++) {
        lvc.iSubItem = iCol;
        LoadString(g_hinst, IDS_FIRSTCOLUMN + iCol,
            g_achTemp, sizeof(g_achTemp));
        if (ListView_InsertColumn(hwndLV, iCol, &lvc) == -1)
            return FALSE;
```

-continued

```
    }
    return TRUE;
}
```

Adding Items to a List View

An application can add items to a list view control by using the LVM_INSERTITEM message. The attributes of a list view item that are specified by an LV_ITEM structure include a state, a label, an icon, and item data. Associated with each item may be one or more subitems, which are strings that appear to the right of an item in report view.

The example in this section adds a list view item for each fine in a text file. Semicolons are assumed to separate the item label and the subitem strings that follow it. The example saves each item's label and subitem strings in a structure, which is defined as follows in the application's header file.

```
#define C_COLUMNS 6
typedef struct myitem_taq {
    LPSTR aCols[C_COLUMNS];
} MYITEM;
```

The application then fills in an LV_ITEM structure and adds a list view item by using the LVM_INSERTITEM message. Because the application saves the item label in its own application-defined MYITEM structure, it specifies the LPSTR_TEXTCALLBACK value for the pszText member of the LV_ITEM structure. Specifying this value causes the control to send an LVN_GETDISPINFO notification message to its owner window whenever it needs to display the item. The address of the application-defined structure is saved as item data.

```
// InitListViewItems - adds a items and subitems to a list view.
// Returns TRUE if successful or FALSE otherwise.
// hwndLV - handle of the list view control
// pfData - text file containing list view items with columns
//          separated by semicolons
BOOL WINAPI InitListViewItems(HWND hwndLV, FILE *pfData)
{
    extern char g_achTemp[256];      // temporary buffer
    PSTR pszStart;
    PSTR pszEnd;
    int iItem;
    int iSubItem;
    LV_ITEM lvi;
    // Initialize LV_ITEM members that are common to all items.
    lvi.mask = LVIF_TEXT | LVIF_IMAGE | LVIF_PARAM | LVIF_STATE;
    lvi.state = 0;
    lvi.stateMask = 0;
    lvi.pszText = LPSTR_TEXTCALLBACK;  // app. maintains text
    lvi.iImage = 0;                    // image list index
    // Read each line in the specified file.
    for (iItem = 0;
            fgets(g_achTemp, sizeof(g_achTemp), pfData);
            iItem++) {
        // Allocate an application-defined structure to store the
        // item label and the text of each subitem.
        MYITEM *pItem = LocalAlloc(LPTR, sizeof(MYITEM));
        // Copy the first string (the label).
        pszEnd = strchr(g_achTemp, ';');
        *pszEnd = '\0';
        pItem->aCols[0] = DupString(g_achTemp);
        // Copy subsequent strings (subitems).
        for (iSubItem = 1;
                iSubItem < C_COLUMNS && pszEnd != NULL;
                iSubItem++) {
            pszStart = pszEnd + 1;
            if ((pszEnd = strchr(pszStart, ';')) != NULL)
                *pszEnd = '\0';
            pItem->aCols[iSubItem] = DupString(pszStart);
        }
        // Initialize item-specific LV_ITEM members.
        lvi.iItem = iItem;
        lvi.iSubItem = 0;
        lvi.lParam = (LPARAM) pItem;   // item data
        // Add the item.
        ListView_InsertItem(hwndLV, &lvi);
        // There is no need to set the text of the subitems. They
        // default to LPSTR_TEXTCALLBACK.
    }
    return TRUE;
}
// DupString - allocates a copy of a string.
// lpsz - address of the null-terminated string to copy
LPSTR DupString(LPSTR lpsz)
{
    int cb = lstrlen(lpsz) + 1;
    LPSTR lpszNew = LocalAlloc(LMEM_FIXED, cb);
    if (lpszNew != NULL)
        CopyMemory(lpszNew, lpsz, cb);
    return lpszNew;
}
```

Processing the WM_NOTIFY Message

A list view control notifies its parent window of events by sending a WM_NOTIFY message. The wParam parameter is the identifier of the control, and the lParam parameter is the address of an NMHDR structure (or to a larger structure, which has an NMHDR structure as its first member). The example in this section processes the LVN_GETDISPINFO, LVN_ENDLABELEDIT, and LVN_COLUMNCLICK notification messages.

A list view control sends the LVN_GETDISPINFO notification message to retrieve information about an item or subitem from the parent window. This notification is sent, for example, when an item with the LPSTR_TEXTCALLBACK value needs to be displayed.

A list view control sends the LVN_ENDLABELEDIT notification message when the user completes or cancels editing of an item's label. This notification is only sent if the list view has the LVS_EDITLABELS window style. If editing is being canceled, the parent window typically does nothing. If editing is being completed, the parent window should set the item label to the new text unless the item label is LPSTR_TEXTCALLBACK. In that case, the parent window should simply update the application-defined data it maintains for the list item.

A list view control sends the LVN_COLUMNCLICK notification message if the user clicks a column header in report view. Typically, an application sorts a list view by the specified column when this clicking occurs. To sort, use the LVM_SORTITEMS message, specifying an application-defined comparison function.

The following example shows the portion of the application's window procedure that processes the WM_NOTIFY message.

```
case WM_NOTIFY:
    // Branch depending on the specific notification message.
    switch (((LPNMHDR) lParam)->code) {
```

```
        // Process LVN_GETDISPINFO to supply information about
        //   callback items.
        case LVN_GETDISPINFO:
            Main_OnGetDispInfo((LV_DISPINFO *) lParam);
            break;
        // Process LVN_ENDLABELEDIT to change item labels after
        //   in-place editing.
        case LVN_ENDLABELEDIT:
            return Main_OnEndLabelEdit(
                (LV_DISPINFO *) lParam
                );
        // Process LVN_COLUMNCLICK to sort items by column.
        case LVN_COLUMNCLICK:
            #define pnm ((NM_LISTVIEW *) lParam)
            ListView_SortItems(
                pnm->hdr.hwndFrom,
                ListViewCompareFunc,
                (LPARAM) (pnm->iSubItem)
                );
            #undef pnm
            break;
    }
    break;

The following example shows the application-defined
functions that the window procedure uses to process list
view notification messages.

// Main_OnGetDispInfo - processes the LVN_GETDISPINFO
//   notification message.
// pnmv - value of lParam (points to an LV_DISPINFO structure)
VOID WINAPI Main_OnGetDispInfo(LV_DISPINFO *pnmv)
{
    // Provide the item or subitem's text if requested.
    if (pnmv->item.mask & LVIF_TEXT) {
        MYITEM *pItem = (MVITEM *) (pnmv->item.lParam);
        lstrcpy(pnmv->item.pszText,
            pItem->aCols(pnmv->item.iSubItem));
    }
}
// Main_OnEndLabelEdit - processes the LVN_ENDLABELEDIT
//   notification message.
// Returns TRUE if the label is changed or FALSE otherwise.
// pnmv - value of lParam (points to an LV_DISPINFO structure)
BOOL Main_OnEndLabelEdit(LV_DISPINFO *pnmv)
{
    MYITEM *pItem;
    // The item is -1 if editing is being canceled.
    if (pnmv->item.iItem == -1)
        return FALSE;
    // Copy the new text to the application-defined structure,
    // a pointer to which is saved as item data.
    pItem = (MYITEM *) (pnmv->item.lParam);
    pItem->aCols[0] = (PSTR) LocalReAlloc(
        (HLOCAL) (pItem->aCols[0]),
        lstrlen(pnmv->item.pszText) + 1,
        LMEM_MOVEABLE
        );
    lstrcpy(pItem->aCols[0], pnmv->item.pszText);
    // No need to set the item text, because it is a callback item.
    return TRUE;
}
// ListViewCompareFunc - sorts the list view control. It is a
//   comparison function.
// Returns a negative value if the first item should precede the
//   second item, a positive value if the first item should
//   follow the second item, and zero if the items are equivalent.
// lParam1 and lParam2 - item data for the two items (in this
//   case, pointers to application-defined MYITEM structures)
// lParamSort - value specified by the LVM_SORTITEMS message
//   (in this case, the index of the column to sort)
int CALLBACK ListViewCompareFunc(
    LPARAM lParam1,
    LPARAM lParam2,
    LPARAM lParamSort)
{
    MYITEM *pItem1 = (MYITEM *) lParam1;
    MYITEM *pItem2 = (MYITEM *) lParam2;
    // Compare the specified column.
    int iCmp = lstrcmpi(pItem1->aCols[lParamSort],
        pItem2->aCols[lParamSort]);
    // Return the result if nonzero. Otherwise, compare the
    // first column.
    return (iCmp != 0) ? iCmp :
        lstrcmpi(pItem1->aCols[0], pItem2->aCols[0]);
}
```

Changing List View Styles

An application can change the window style of a list view control after it is created by using the GetWindowLong and SetWindowLong functions. The following example changes the style bits that govern the view mode.

```
// SetView - sets a list view's window style to change the view.
// hwndLV - handle of the list view control
// dwView - value specifying a new style
VOID WINAPI SetView(HWND hwndLV, DWORD dwView)
{
    // Get the current window style.
    DWORD dwStyle = GetWindowLong(hwndLV, GWL_STYLE);
    // Only set the window style if the view bits have changed.
    if ((dwStyle & LVS_TYPEMASK) != dwView)
        SetWindowLong(hwndLV, GWL_STYLE,
            (dwStyle & ~LVS_TYPEMASK) | dwView);
}
```

Reference

The list view messages, notification messages, and structures can be grouped as follows.
Items and Subitems
LV_ITEM
LVM_DELETEALLITEMS
LVM_DELETEITEM
LVM_GETITEM
LVM_GETITEMCOUNT
LVM_GETITEMSTATE
LVM_GETITEMTEXT
LVM_INSERTITEM
LVM_SETITEM
LVM_SETITEMCOUNT
LVM_SETITEMSTATE
LVM_SETITEMTEXT
Callback Items
LV_DISPINFO
LVM_GETCALLBACKMASK
LVM_REDRAWITEMS
LVM_SETCALLBACKMASK
LVM_UPDATE
LVN_GETDISPINFO
LVN_SETDISPINFO
Columns
LV_COLUMN
LVM_DELETECOLUMN
LVM_GETCOLUMN
LVM_GETCOLUMNWIDTH
LVM_GETSTRINGWIDTH
LVM_INSERTCOLUMN
LVM_SETCOLUMN
LVM_SETCOLUMNWIDTH
LVN_COLUMNCLICK
Arranging, Sorting, and Finding
LV_FINDINFO LVM_ARRANGE
LVM_FINDITEM
LVM_GETNEXTITEM
LVM_SORTITEMS
Item Positions and Scrolling
LV_HITTESTINFO
LVM_ENSUREVISIBLE
LVM_GETCOUNTPERPAGE
LVM_GETITEMPOSITION
LVM_GETITEMRECT
LVM_GETORIGIN
LVM_GETTOPINDEX
LVM_GETVIEWRECT
LVM_HITTEST
LVM_SCROLL
LVM_SETITEMPOSITION
Colors
LVM_GETBKCOLOR
LVM_GETTEXTBKCOLOR
LVM_GETTEXTCOLOR
LVM_SETBKCOLOR
LVM_SETTEXTBKCOLOR
LVM_SETTEXTCOLOR
Miscellaneous
LV_KEYDOWN
LVM_CREATEDRAGIMAGE
LVM_EDITLABEL
LVM_GETEDITCONTROL
LVM_GETIMAGELIST
LVM_SETIMAGELIST
LVN_BEGINDRAG
LVN_BEGINLABELEDIT
LVN_BEGINDRAG
LVN_DELETEALLITEMS
LVN_DELETEITEM
LVN_ENDDRAG
LVN_ENDLABELEDIT
LVN_ENDDRAG
LVN_INSERTITEM
LVN_ITEMCHANGED
LVN_ITEMCHANGING
LVN_KEYDOWN
NM_LISTVIEW
Messages An application sends messages to a list view control to alter its appearance, add or change items and columns, and so on. Each message has a corresponding macro, which the application programmer can use instead of sending the message explicitly.

LVM_ARRANGE

```
LVM_ARRANGE
wParam = (WPARAM) (int) code;
lParam = 0;
// Corresponding macro
BOOL ListView_Arrange(HWND hwnd, UINT code);
```

Arranges items in icon view. The application programmer can send this message explicitly or by using the ListView_Arrange macro.
Returns TRUE if successful or FALSE otherwise.
hwnd
    Handle of the list view control.
code
    Alignment that can be combined with an optional sort flag. The alignment can be one of these values:

| | |
|---|---|
| LVA_ALIGNBOTTOM | Aligns items along the bottom edge of the window. |
| LVA_ALIGNLEFT | Aligns items along the left edge of the window. |
| LVA_ALIGNRIGHT | Aligns items along the right edge of the window. |
| LVA_ALIGNTOP | Aligns items along the top edge of the window. |
| LVA_DEFAULT | Aligns items according to the list view's current alignment styles (the default value). |
| LVA_SNAPTOGRID | Snaps all icons to the nearest grid position. |

The sort flag, if specified, sorts items by text in ascending or descending order. It can be the LVA_SORTASCENDING or LVA_SORTDESCENDING value.

LVM_CREATEDRAGIMAGE

```
LVM_CREATEDRAGIMAGE
wParam = (WPARAM) (int) iItem;
lParam = (LPARAM) (LPPOINT) lpptUpLeft;
// Corresponding macro
HIMAGELIST ListView_CreateDragImage(HWND hwnd, int iItem,
    LPPOINT lpptUpLeft);
```

Creates a drag image list for the specified item. The application programmer can send this message explicitly or by using the ListView_CreateDragImage macro.
Returns the handle of the drag image list if successful or NULL otherwise.
hwnd and iItem
    Handle of the list view control, and the index of the item.
lpptUpLeft
    Address of a POINT structure that receives the initial location of the upper left corner of the image, in view coordinates.

LVM_DELETEALLITEMS

```
LVM_DELETEALLITEMS
wParam = 0;
lParam = 0;
// Corresponding macro
BOOL ListView_DeleteAllItems(HWND hwnd);
```

Removes all items from a list view control. The application programmer can send this message explicitly or by using the ListView_DeleteAllItems macro.
Returns TRUE if successful or FALSE otherwise.
hwnd
    Handle of the list view control.

LVM_DELETECOLUMN

```
LVM_DELETECOLUMN
wParam = (WPARAM) (int) iCol;
lParam = 0;
// Corresponding macro
BOOL ListView_DeleteColumn(HWND hwnd, int iCol);
```

Removes a column from a list view control. The application programmer can send this message explicitly or by using the ListView_DeleteColumn macro.

Return TRUE if successful or FALSE otherwise.
hwnd and iCol
   Handle of the list view control, and the index of the column to delete.
LVM_DELETEITEM

---

LVM_DELETEITEM
wParam = (WPARAM) (int) iItem;
lParam = 0;
// Corresponding macro
BOOL ListView_DeleteItem(HWND hwnd, int iItem);

---

Removes an item from a list view control. The application programmer can send this message explicitly or by using the ListView_DeleteItem macro.
Returns TRUE if successful or FALSE otherwise.
hwnd and iItem
   Handle of the list view control, and the index of the list view item to delete.
LVM_EDITLABEL

---

LVM_EDITLABEL
wParam = (WPARAM) (int) iItem;
lParam = 0;
// Corresponding macro
HWND ListView_EditLabel(HWND hwnd, int iItem);

---

Begins in-place editing of the specified list view item's text. The message implicitly selects and focuses the specified item. The application programmer can send this message explicitly or by using the ListView_EditLabel macro.
Returns the handle of the edit control that is used to edit the item text if successful or NULL otherwise.
hwnd and iItem
   Handle of the list view control, and the index of the list view item.
   When the user completes or cancels editing, the edit control is destroyed and the handle is no longer valid. The application programmer can safely subclass the edit control, but do not destroy it. To cancel editing, the application programmer can send the list view control a WM_CANCELMODE message.
LVM_ENSUREVISIBLE

---

LVM_ENSUREVISIBLE
wParam = (WPARAM) (int) iItem;
lParam = (LPARAM) (BOOL) fPartialOk;
// Corresponding macro
BOOL ListView_EnsureVisible(HWND hwnd, int i, BOOL fPartialOK);

---

Ensures that a list view item is entirely or at least partially visible, scrolling the list view control if necessary. The application programmer can send this message explicitly or by using the ListView_EnsureVisible macro.
Returns TRUE if successful or FALSE Otherwise.
hwnd and i
   Handle of the list view control, and the index of the list view item.
fPartialOk
   Value specifying whether the item must be entirely visible. If this parameter is TRUE, no scrolling occurs if the item is at least partially visible.

LVM_FINDITEM

---

LVM_FINDITEM
wParam = (WPARAM) (int) iStart;
lParam = (LPARAM) (const LV_FINDINFO FAR *) plvfi;
// Corresponding macro
int ListView_FindItem(HWND hwnd, int iStart,
   const LV_FINDINFO FAR* plvfi);

---

Searches for a list view item with specified characteristics. The application programmer can send this message explicitly or by using the ListView_FindItem macro.
Returns the index of the item if successful or −1 otherwise.
hwnd
   Handle of the list view control.
iStart
   Index of the item to begin the search with or −1 to start from the beginning. The specified item is itself excluded from the search.
plvfi
   Address of an LV_FINDINFO structure that contains information about what to search for.
LVM_GETBKCOLOR

---

LVM_GETBKCOLOR
wParam = 0;
lParam = 0;
// Corresponding macro
COLORREF ListView_GetBkColor(HWND hwnd);

---

Retrieves the background color of a list view control. The application programmer can send this message explicitly or by using the ListView_GetBkColor macro.
Returns the background color of the list view.
hwnd
   Handle of the list view control.
LVM_GETCALLBACKMASK

---

LVM_GETCALLBACKMASK
wParam = 0;
lParam = 0;
// Corresponding macro
UINT ListView_GetCallbackMask(HWND hwnd);

---

Retrieves the callback mask for a list view control. The application programmer can send this message explicitly or by using the ListView_GetCallbackMask macro.
Returns the callback mask
hwnd
   Handle of the list view control.
LVM_GETCOLUMN

---

LVM_GETCOLUMN
wParam = (WPARAM) (int) iCol;
lParam = (LPARAM) (LV_COLUMN FAR *) pcol;
// Corresponding macro
BOOL ListView_GetColumn(HWND hwnd, int iCol,
   LV_COLUMN FAR* pcol);

Retrieves the attributes of a list view control's column. The application programmer can send this message explicitly or by using the ListView_GetColumn macro.
Returns TRUE if successful or FALSE otherwise.
hwnd and iCol
  Handle of the list view control, and the index of the column.
pcol
  Address of an LV_COLUMN structure that specifies the information to retrieve and receives information about the column. The mask member specifies which column attributes to retrieve.
  If the mask member specifies the LVCF_TEXT value, the pszText member must contain the address of the buffer that receives the item text and the cchTextMax member must specify the size of the buffer.
LVM_GETCOLUMNWIDTH

---

LVM_GETCOLUMNWIDTH
wParam = (WPARAM) (int) iCol;
lParam = 0;
// Corresponding macro
int ListView_GetColumnWidth(HWND hwnd, int iCol);

---

Retrieves the width of a column in report view or list view. The application programmer can send this message explicitly or by using the ListView_GetColumnWidth macro.
Returns the column width if successful or zero otherwise.
hwnd and iCol
  Handle of the list view control, and the index of the column. The iCol parameter is ignored in list view.
LVM_GETCOUNTPERPAGE

---

LVM_GETCOUNTPERPAGE
wParam = 0;
lParam = 0;
// Corresponding macro
int ListView_GetCountPerPage(HWND hwnd);

---

Calculates the number of items that can fit vertically in the visible area of a list view control when in list view or report view. The application programmer can send this message explicitly or by using the ListView_GetCountPerPage macro.
Returns the number of items if successful. If the current view is icon or small icon view, the return value is the total number of items in the list view.
hwnd
  Handle of the list view control.
LVM_GETEDITCONTROL

---

LVM_GETEDITCONTROL
wParam = 0;
lParam = 0;
// Corresponding macro
HWND ListView_GetEditControl(HWND hwnd, int i);

---

Retrieves the handle of the edit control being used to edit a list view item's text. The application programmer can send this message explicitly or by using the ListView_GetEditControl macro.
Returns the handle of the edit control if successful or NULL otherwise.
hwnd and i
  Handle of the list view control, and the index of the list view item.
  If no label is being edited, the return value is NULL. The edit control is not created until after the LVN_BEGINLABELEDIT notification message is sent.
  When the user completes or cancels editing, the edit control is destroyed and the handle is no longer valid. The application programmer can safely subclass the edit control, but do not destroy it. To cancel editing, the application programmer can send the list view a WM_CANCELMODE message.
  The list view item being edited is the currently focused item—that is, the item in the focused state. To find an item based on its state, use the LVM_GETNEXTITEM message.
LVM_GETIMAGELIST

---

LVM_GETIMAGELIST
wParam = (WPARAM) (int) iImageList;
lParam = 0;
// Corresponding macro
HIMAGELIST ListView_GetImageList(HWND hwnd, int iImageList);

---

Retrieves the handle of an image list used for drawing list view items. The application programmer can send this message explicitly or by using the ListView_GetImageList macro.
Returns the handle of the specified image list if success or NULL otherwise.
hwnd
  Handle of the list view control.
iImageList
  Value specifying which image list to retrieve. It can be one of these values:

| | |
|---|---|
| LVSIL_NORMAL | Image list with large icons |
| LVSIL_SMALL | Image list with small icons |
| LVSIL_STATE | Image list with state images |

LVM_GETITEM

---

LVM_GETITEM
wParam = 0;
lParam = (LPARAM) (LV_ITEM FAR*) pItem;
// Corresponding macro
BOOL ListView_GetItem(HWND hwnd, LV_ITEM FAR* pitem);

---

Retrieves some or all of a list view item's attributes. The application programmer can send this message explicitly or by using the ListView_GetItem macro.
Returns TRUE if successful or FALSE otherwise.
hwnd
  Handle of the list view control.
pitem
  Address of an LV_ITEM structure that specifies the information to retrieve and receives information about the list view item.
  When the message is sent, the iItem and iSubItem members identify the item or subitem to retrieve information about and the mask member specifies which attributes to get. For a list of possible values, see the description of the LV_ITEM structure.

If the mask member specifies the LVIF_TEXT value, the pszText member must contain the address of the buffer that receives the item text and the cchTextMax member must specify the size of the buffer.

If the mask member specifies the LVIF_STATE value, the stateMask member specifies which item states are to be returned.

LVM_GETITEMCOUNT

```
LVM_GETITEMCOUNT
wParam = 0;
lParam = 0;
```

Retrieves the number of items in a list view control. The application programmer can send this message explicitly or by using the ListView_GetItemCount macro.

Returns the number of items.

hwnd
   Handle of the list view control.

LVM_GETITEMPOSITION

```
LVM_GETITEMPOSITION
wParam = (WPARAM) (int) i;
lParam = (LPARAM) (POINT FAR *) ppt;
// Corresponding macro
BOOL ListView_GetItemPosition(HWND hwnd, int i, POINT FAR* ppt);
```

Retrieves the position of a list view item. The application programmer can send this message explicitly or by using the ListView_GetItemPosition macro.

Returns TRUE if successful or FALSE otherwise.

hwnd and i
   Handle of the list view control, and the index of the list view item.

ppt
   Address of a POINT structure that receives the position of the item's upper left corner, in view coordinates.

If a list view control has the LVS_NOITEMDATA style, this macro cannot be used in icon or small icon view.

LVM_GETITEMRECT

```
LVM_GETITEMRECT
wParam = (WPARAM) (int) i;
lParam = (LPARAM) (LPRECT) prc;
// Corresponding macro
BOOL ListView_GetItemRect(HWND hwnd, int i, RECT FAR* prc, int code);
```

Retrieves the bounding rectangle for all or part of an item in the current view. The application programmer can send this message explicitly or by using the ListView_GetItemRect macro.

Returns TRUE if successful or FALSE otherwise.

hwnd and i
   Handle of the list view control, and the index of the list view item.

prc
   Address of a RECT structure that receives the bounding rectangle. When the message is sent, the left member of this structure contains the value of the code parameter.

code
   Portion of the list view item for which to retrieve the bounding rectangle. It can be one of these values:

| | |
|---|---|
| LVIR_BOUNDS | Returns the bounding rectangle of the entire item, including the icon and label. |
| LVIR_ICON | Returns the bounding rectangle of the icon or small icon. |
| LVIR_LABEL | Returns the bounding rectangle of the item text. |

This parameter is specified by the left member of the RECT structure pointed to by the prc parameter.

LVM_GETITEMSTATE

```
LVM_GETITEMSTATE
wParam = (wPARAM) (int) i;
lParam = (LPARAM) (UINT) mask;
// Corresponding macro
UINT WINAPI ListView_GetItemState(HWND hwnd, int i, UINT mask);
```

Retrieves the state of a list view item. The application programmer can send this message explicitly or by using the ListView_GetItemState macro.

Returns the item's state flags.

hwnd and i
   Handle of the list view control, and the index of the list view item.

mask
   Mask specifying which of the item's state flags to return.

LVM_GETITEMTEXT

```
LVM_GETITEMTEXT
wParam = (WPARAM) (int) iItem;
lParam = (LPARAM) (LV_ITEM FAR *) pitem;
// Corresponding macro
void WINAPI ListView_GetItemText(HWND hwnd, int iItem,
    int iSubItem, LPSTR pszText, int cchTextMax);
```

Retrieves the text of a list view item or subitem.

If the application programmer sends this message explicitly, it returns the length of the retrieved string, and it has the following parameters:

hwnd and iItem
   Handle of the list view control, and the index of the list view item.

pitem
   Address of an LV_ITEM structure. The isubItem member specifies the index of a subitem, or it can be zero to get the item label. The pszText member points to a buffer that receives the text, and the cchTextMax member specifies the size of the buffer.

The application programmer can send this message implicitly by using the ListView_GetItemText macro. The macro has no return value, and it has the following parameters:

hwnd and iItem
   Handle of the list view control, and the index of the list view item.

iSubItem

Index of the subitem, or zero to retrieve the item label.

pszText and cchTextMax

Address of the buffer that receives the item or subitem text, and the size of the buffer, in bytes.

LVM_GETNEXTITEM

---

LVM_GETNEXTITEM
wParam = (WPARAM) (int) iStart;
lParam = MAKELPARAM((UINT) flags, 0);
// Corresponding macro
int ListView_GetNextItem(HWND hwnd, int iStart, UINT flags);

---

Searches for a list view item that has the specified properties and that bears the specified relationship to a given item. The application programmer can send this message explicitly or by using the ListView_GetNextItem macro.

Returns the index of the next item if successful or −1 otherwise.

hwnd

Handle of the list view control.

istart

Index of the item to begin the searching with, or −1 to find the first item that matches the specified flags. The specified item itself is excluded from the search.

flags

Geometric relation of the requested item to the specified item, and the state of the requested item.

The geometric relation can be one of these values:

---

| | |
|---|---|
| LVNI_ABOVE | Searches for an item that is above the specified item. |
| LVNI_ALL | Searches for a subsequent item by index (the default value). |
| LVNI_BELOW | Searches for an item that is below the specified item. |
| LVNI_PREVIOUS | Searches for a previous item by index. |
| LVNI_TOLEFT | Searches for an item to the left of the specified item. |
| LVNI_TORIGHT | Searches for an item to the right of the specified item. |
| The state can be zero, or it can be one or more of these values: | |
| LVNI_DROPHILITED | The item has the LVIS_DROPHILITED state flag set. |
| LVNI_FOCUSED | The item has the LVIS_FOCUSED state flag set. |
| LVNI_HIDDEN | The item has the LVIS_HIDDEN state flag set. |
| LVNI_MARKED | The item has the LVIS_MARKED state flag set. |
| LVNI_SELECTED | The item has the LVIS_SELECTED state flag set. |

---

If an item does not have all of the specified state flags set, the search continues with the next item.

LVM_GETORIGIN

---

LVM_GETORIGIN
wParam = 0;
lParam = (LPARAM) (LPPOINT) lpptOrg;
// Corresponding macro
BOOL ListView_GetOrigin(HWND hwnd, LPPOINT lpptOrg);

---

Retrieves the current view origin for a list view control. The application programmer can send this message explicitly or by using the ListView_GetOrigin macro.

Returns TRUE if successful or FALSE if the current view is list view or report view.

Handle of the list view control.

lpptOrg

Address of a POINT structure that receives the view origin.

LVM_GETSTRINGWIDTH

---

LVM_GETSTRINGWIDTH
wParam = 0;
lParam = (LPARAM) (LPCSTR) psz;
// Corresponding macro
int ListView_GetStringWidth(HWND hwnd, LPCSTR psz);

---

Determines the minimum column width necessary to display all of a given string. You can send this message explicitly or by using the ListView_GetStringWidth macro. Returns the column width if successful or zero otherwise.

hwnd

Handle of the list view control.

psz

Address of a null-terminated string.

The returned width takes into account the current font and column margins of the list view control, but it does not take into account the width of a small icon.

LVM_GETTEXTBKCOLOR

---

LVM_GETTEXTBKCOLOR
wParam = 0;
lParam = 0;
// Corresponding macro
COLORREF ListView_GetTextBkColor(HWND hwnd);

---

Retrieves the text background color of a list view control. The application programmer can send this message explicitly or by using the ListView_GetTextBkColor macro. Returns the background color of the text.

hwnd

Handle of the list view control.

LVM_GETTEXTCOLOR

---

LVM_GETTEXTCOLOR
wParam = 0;
lParam = 0;
// Corresponding macro
COLORREF ListView_GetTextColor(HWND hwnd);

---

Retrieves the text color of a list view control. The application programmer can send this message explicitly or by using the ListView_GetTextColor macro. Returns the text color.

hwnd

Handle of the list view control.

LVM_GETTOPINDEX

---

LVM_GETTOPINDEX
wParam = 0;
lParam = 0;
// Corresponding macro
int ListView_GetTopIndex(HWND hwnd);

---

Retrieves the index of the topmost visible item when in list view or report view. The application programmer can send this message explicitly or by using the ListView_GetTopIndex macro.

Returns the index of the item if successful or zero if the list view is in icon or small icon view.

hwnd

Handle of the list view control.

LVM_GETVIEWRECT

---

LVM_GETVIEWRECT
wParam = 0;
lParam = (LPARAM) (RECT FAR *) prc;
// Corresponding macro
BOOL ListView_GetViewRect(HWND hwnd, RECT FAR* prc);

---

Retrieves the bounding rectangle of all items in the list view control. The list view must be in icon or small icon view. The application programmer can send this message explicitly or by using the ListView_GetViewRect macro.

Returns TRUE if successful or FALSE otherwise.

hwnd

Handle of the list view control.

prc

Address of a RECT structure that receives the bounding rectangle. All coordinates are relative to the visible area of the list view.

LVM_HITTEST

---

LVM_HITTEST
wParam = 0;
lParam = (LPARAM) (LV_HITTESTINFO FAR *) pinfo;
// Corresponding macro
int ListView_HitTest(HWND hwnd, LV_HITTESTINFO FAR* pinfo);

---

Determines which list view item, if any, is at a specified position. The application programmer can send this message explicitly or by using the ListView_HitTest macro.

Returns the index of the item at the specified position, if any, or −1 otherwise.

hwnd

Handle of the list view control.

pinfo

Address of a LV_HITTESTINFO structure that contains the position to hit test and receives information about the results of the hit test.

LVM_INSERTCOLUMN

---

LVM_INSERTCOLUMN
wParam = (WPARAM) (int) iCol;
lParam = (LPARAM) (const LV_COLUMN FAR *) pcol;
// Corresponding macro
int ListView_InsertColumn(HWND hwnd, int iCol,
    const LV_COLUMN FAR* pcol);

---

Inserts a new column in a list view control. The application programmer can send this message explicitly or by using the ListView_InsertColumn macro.

Returns the index of the new column if successful or −1 otherwise.

hwnd and iCol

Handle of the list view control, and the index of the new column.

pcol

Address of an LV_COLUMN structure that contains the attributes of the new column.

LVM_INSERTITEM

---

LVM_INSERTITEM
wParam = 0;
lParam = (LPARAM) (const LV_ITEM FAR *) pitem;
// Corresponding macro
int ListView_InsertItem(HWND hwnd, const LV_ITEM FAR* pitem);

---

Inserts a new item in a list view control. The application programmer can send this message explicitly or by using the ListView_InsertItem macro.

Returns the index of the new item if successful or −1 otherwise.

hwnd

Handle of the list view control.

pitem

Address of an LV_ITEM structure that specifies the attributes of the list view item. The iItem member specifies the index of the new item. The isubItem member must be zero; the macro cannot be used to insert subitems.

LVM_REDRAWITEMS

---

LVH_REDRAWITEMS
wParam = 0;
lParam = MAKELPARAM((int) iFirst, (int), iLast);
// Corresponding macro
BOOL ListView_RedrawItems(HWND hwnd, int iFirst, int iLast);

---

Forces a list view control to repaint a range of items. The application programmer can send this message explicitly or by using the ListView_RedrawItems macro.

Returns TRUE if successful or FALSE otherwise.

hwnd

Handle of the list view control.

ifirst and iLast

Index of the first and last items to repaint.

The specified items are not actually repainted until the list view window receives a WM_PAINT message. To repaint immediately, call the UpdateWindow function after using this macro.

LVM_SCROLL

---

LVM_SCROLL
wParam = 0;
lParam = MAKELPARAM((int) dx, (int) dy);
// Corresponding macro
BOOL ListView_Scroll(HWND hwnd, int dx, int dy);

---

Scrolls the content of a list view control. The application programmer can send this message explicitly or by using the ListView_Scroll macro.

Returns TRUE if successful or FALSE otherwise.

hwnd

Handle of the list view control.

dx and dy

Amount of horizontal and vertical scrolling, in pixels. If the current view is report view, dx must be zero and dy is the number of lines to scroll.

LVM_SETBKCOLOR

---

LVM_SETBKCOLOR
wParam = 0;
lParam = (LPARAM) (COLORREF) clrBk;
// Corresponding macro
BOOL ListView_SetBkColor(HWND hwnd, COLORREF clrBk);

---

Sets the background color of the list view control. The application programmer can send this message explicitly or by using the ListView_SetBkColor macro.

Returns TRUE if successful or FALSE otherwise.

hwnd

Handle of the list view control.

clrBk

Background color to set, or the CLR_NONE value for no background color. List view controls with background colors redraw themselves significantly faster than those without background colors.

LVM_SETCALLBACKMASK

---

LVM_SETCALLBACKMASK
wParam = (WPARAM) (UINT) mask;
lParam = 0;
// Corresponding macro
BOOL ListView_SetCallbackMask(HWND hwnd, UINT mask);

---

Sets the callback mask for a list view control. The application programmer can send this message explicitly or by using the ListView_SetCallbackMask macro.

Returns TRUE if successful or FALSE otherwise.

hwnd

Handle of the list view control.

mask

New value of the callback mask.

LVM_SETCOLUMN

---

LVM_SETCOLUMN
wParam = (WPARAM) (int) iCol;
lParam = (LPARAM) (const LV_COLUMN FAR *) pcol;
// Corresponding macro
BOOL ListView_SetColumn(HWND hwnd, int iCol, LV_COLUMN FAR* pcol);

---

Sets the attributes of a list view column. The application programmer can send this message explicitly or by using the ListView_SetColumn macro.

Returns TRUE if successful or FALSE otherwise.

hwnd and iCol

Handle of the list view control, and the index of the column.

pcol

Address of an LV_COLUMN structure that contains the new column attributes. The mask member specifies which column attributes to set.

If the mask member specifies the LVCF_TEXT value, the pszText member is the address of a null-terminated string and the cchTextMax member is ignored.

LVM_SETCOLUMNWIDTH

---

LVM_SETCOLUMNWIDTH
wParam = (WPARAM) (int) iCol;
lParam = MAKELPARAM((int) cx, 0);
// Corresponding macro
BOOL ListView_SetColumnWidth(HWND hwnd, int iCol, int cx);

---

Changes the width of a column in report view or list view. The application programmer can send this message explicitly or by using the ListView_SetColumnWidth macro.

Returns TRUE if successful or FALSE otherwise.

hwnd and iCol

Handle of the lid view control, and the index of the column. In list view, the iCol parameter must be −1.

cx

New width of the column.

LVM_SETIMAGELIST

---

LVM_SETIMAGELIST
wParam = (WPARAM) (int) iImageList;
lParam = (LPARAM) (HIMAGELIST) himl;
// Corresponding macro
BOOL ListView_SetImageList(HWND hwnd, HIMAGELIST himl, int iImageList);

---

Assigns an image list to a list view control. The application programmer can send this message explicitly or by using the ListView_SetImageList macro.

Returns TRUE if successful or FALSE otherwise.

hwnd

Handle of the list view control.

himl

Handle of the image list to assign.

iImageList

Type of image list. It can be one of these values:

LVSIL_NORMAL Image list with large icons

LVSIL_SMALL Image list with small icons

LVSIL_STATE Image list with state images

LVM_SETITEM

---

LVM_SETITEM
wParam = 0;
lParam = (LPARAM) (const LV_ITEM FAR *) pitem;
// Corresponding macro
BOOL ListView_SetItem(HWND hwnd, const LV_ITEM FAR* pitem);

---

Sets some or all of a list view item's attributes. The application programmer can send this message explicitly or by using the ListView_SetItem macro.

Returns TRUE if successful or FALSE otherwise.

hwnd

Handle of the list view control.

pitem

Address of an LV_ITEM structure that contains the new item attributes. The iItem and iSubItem members identify the item or subitem, and the mask member specifies which attributes to set.

If the mask member specifies the LVIF_TEXT value, the pszText member is the address of a null-terminated string and the cchTextMax member is ignored.

If the mask member specifies the LVIF_STATE value, the stateMask member specifies which item states to change and the state member contains the values for those states.

LVM_SETITEMCOUNT

```
LVM_SETITEMCOUNT
wParam = (WPARAM) (int) cItems;
lParam = 0;
// Corresponding macro
VOID ListView_SetItemCount(HWND hwnd, int cItems);
```

Prepares a list view control for adding a large number of items. The application programmer can send this message explicitly or by using the ListView_SetItemCount macro.

No return value.

hwnd

Handle of the list view control.

cItems

Number of items that the control will ultimately contain.

By sending this message before adding a large number of items, the application programmer enables a list view control to reallocate its internal data structures only once rather than every time the application programmer adds an item.

LVM_SETITEMPOSITION

```
LVM_SETITEMPOSITION
wParam = (LPARAM) (int) i;
lParam = MAKELPARAM(int) x, (int) y);
// Corresponding macro
BOOL ListView_SetItemPosition(HWND hwnd, int i, int x, int y);
```

Moves an item to a specified position in a list view control. The control must be in icon or small icon view. The application programmer can send this message explicitly or by using the ListView_SetItemPosition macro.

Returns TRUE if successful or FALSE otherwise.

hwnd and i

Handle of the list view control, and the index of the list view item.

x and y

New position of the item's upper left corner, in view coordinates.

If the list view control has the LVS_AUTOARRANGE style, the list view is arranged after the position of the item is set. This macro cannot be used for list views that have the LVS_NOITEMDATA style.

LVM_SETITEMSTATE

```
LVM_SETITEMSTATE
wParam = (wPARAM) (int) i;
lParam = (LPARAM) (LV_ITEM FAR *) pitem;
// Corresponding macro
BOOL WINAPI ListView_SetItemState(HWND hwnd, int i,
    UINT state, UINT mask);
```

Changes the state of an item in a list view control.

If the application programmer sends this message explicitly, it returns TRUE if successful or FALSE otherwise, and it has the following parameters:

hwnd and i

Handle of the list view control, and the index of the list view item.

pitem

Address of an LV_ITEM structure. The stateMask member specifies which state bits to change, and the state member contains the new values for those bits. The other members are ignored.

The application programmer can send this message implicitly by using the ListView_SetItemState macro. The macro has no return value, and it has the following parameters:

hwnd and i

Handle of the list view control, and the index of the list view item.

state and mask

Value containing the new state bits for the item, and a mask specifying which of the item's current state bits to change.

LVM_SETITEMTEXT

```
LVM_SETITEMTEXT
wParam = (WPARAM) (int) i;
lParam = (LPARAM) (LV_ITEM FAR *) pitem;
// Corresponding macro
VOID WINAPI ListView_SetItemText(HWND hwnd, int i,
    int iSubItem, LPCSTR pszText);
```

Changes the text of a list view item or subitem.

If the application programmer sends this message explicitly, it returns TRUE if successful or FALSE otherwise, and it has the following parameters:

hwnd and i

Handle of the list view control, and the index of the list view item.

pitem

Address of an LV_ITEM structure. The iSubItem member is the index of the subitem, or it can be zero to set the item label. The pszText member is the address of a null-terminated string containing the new text; the member can also be NULL.

The application programmer can send this message implicitly by using the ListView_SetItemText macro. The macro has no return value, and it has the following parameters:

hwnd and i

Handle of the list view control, and the index of the list view item.

iSubItem

Index of the subitem, or zero to set the item label.

pszText

Address of a null-terminated string containing the new text. This parameter can be NULL.

LVM_SETTEXTBKCOLOR

```
LVM_SETTEXTBKCOLOR
wParam = 0;
lParam = (LPARAM) (COLORREF) clrText;
// Corresponding macro
BOOL ListView_SetTextBkColor(HWND hwnd, COLORREF clrText);
```

Sets the background color of text in a list view control. The application programmer can send this message explicitly or by using the ListView_SetTextBkColor macro.
Returns TRUE if successful or FALSE otherwise.
hwnd
    Handle of the list view control.
clrText
    New text color.
LVM_SETTEXTCOLOR

---

LVM_SETTEXTCOLOR
wParam = 0;
lParam = (LPARAM) (COLORREF) clrText;
// Corresponding macro
BOOL ListView_SetTextColor(HWND hwnd, COLORREF clrText);

---

Sets the text color of a list view control. The application programmer can send this message explicitly or by using the ListView_SetTextColor macro.
Returns TRUE if successful or FALSE otherwise.
hwnd
    Handle of the list view control.
clrText
    New text color.
LVM_SORTITEMS

---

LVM_SORTITEMS
wParam = (WPARAM) (LPARAM) lParamSort;
lParam = (LPARAM) (PFNLVCOMPARE) pfnCompare;
// Corresponding macro
BOOL ListView_SortItems(HWND hwnd, PFNLVCOMPARE pfnCompare,
    LPARAM lParamSort);

---

Sorts list view items using an application-defined comparison function. The index of each item changes to reflect the new sequence. The application programmer can send this message explicitly or by using the ListView_SortItems macro.
Returns TRUE if successful or FALSE otherwise.
hwnd
    Handle of the list view control.
pfnCompare
    Address of the application-defined comparison function. The Comparison function is called during the sort operation each time the relative order of two list items needs to be compared. For more information, see below.
lParamSort
    Application-defined value that is passed to the comparison function.
The comparison function has the following form:

--- int CALLBACK CompareFunc(LPARAM lParam1, LPARAM lParam2,
    LPARAM lParamSort);

---

The comparison function must return a negative value if the first item should precede the second, a positive value if the first item should follow the second, or zero if the two items are equivalent.

The lParam1 and lParam2 parameters specify the item data for the two items being compared. The lParamSort parameter is the same value passed to the LVM_SORTITEMS message.
LVM_UPDATE

---

LVM_UPDATE
wParam = (WPARAM) iItem;
lParam = 0;
// Corresponding macro
BOOL ListView_Update(HWND hwnd, int iItem);

---

Updates a list view item. If the list view control has the LVS_AUTOARRANGE style, this macro causes the list view to be arranged. The application programmer can send this message explicitly or by using the ListView_Update macro.
Returns TRUE if successful or FALSE otherwise.
hwnd and iItem
    Handle of the list view control, and the index of the item to update.
Notification Messages
    A list view control sends notification messages, in the form of WM_NOTIFY messages, to its owner window when events occur in the control.
LVN_BEGINDRAG

---

LVN_BEGINDRAG
pnmv = (NM_LISTVIEW FAR *) lParam;

---

Notifies a list view control's parent window that a drag-and-drop operation involving the left mouse button is being initiated. This notification message is sent in the form of a WM_NOTIFY message.
No return value.
pnmv
    Address of an NM_LISTVIEW structure. The iItem member identifies the item being dragged, and the other members are zero.
LVN_BEGINLABELEDIT

---

LVN_BEGINLABELEDIT
pdi = (LV_DISPINFO FAR *) lParam;

---

Notifies a list view control's parent window about the start of label editing for an item. This notification message is sent in the form of a WM_NOTIFY message.
Returns FALSE to allow label editing or TRUE to prevent it.
pdi
    Address of an LV_DISPINFO structure containing information about the item
LVN_BEGINDRAG

---

LVN_BEGINRDRAG
pnmv = (NM_LISTVIEW FAR *) lParam;

---

Notifies a list view control's parent window that a drag-and-drop operation involving the right mouse button is being initiated. This notification message is sent in the form of a WM_NOTIFY message.

No return value.
pnmv
    Address of an NM_LISTVIEW structure. The iItem identifies the item being dragged, and the other members are zero.

LVN_COLUMNCLICK

---

LVN_COLUMNCLICK
pnmv = (NM_LISTVIEW FAR *) lParam;

---

Notifies a list view control's parent window that a column was clicked. This notification message is sent in the form of a WM_NOTIFY message.
No return value.
pnmv
    Address of an NM_LISTVIEW structure. The iItem member is −1, and the iSubItem member identifies the column. All other members are zero.

LVN_DELETEALLITEMS

--- pnmv = (NM_LISTVIEW FAR *) lParam;

---

Notifies a list view control's parent window that all items in the list view were deleted. This notification message is sent in the form of a WM_NOTIFY message.
No return value.
pnmv
    Address of an NM_LISTVIEW structure. The iItem member is −1, and the other members are zero.

LVN_DELETEITEM

---

LVN_DELETEITEM
pnmv = (NM_LISTVIEW FAR *) lParam;

---

Notifies a list view control's parent window that an item was deleted. This notification message is sent in the form of a WM_NOTIFY message.
No return value.
pnmv
    Address of an NM_LISTVIEW structure. The iItem member identifies the deleted item, and the other members are zero.

LVN_ENDDRAG

---

LVN_ENDDRAG
pnmv = (NM_LISTVIEW FAR *) lParam;

---

Notifies a list view control's parent window about the end of default processing for a drag-and-drop operation involving the left mouse button. This notification message is sent in the form of a WM_NOTIFY message.
No return value.
pnmv
    Address of an NM_LISTVIEW structure. The iItem member identifies the dragged item, and the ptAction member specifies the screen coordinates of the drop location. The other members are zero.

LVN_ENDLABELEDIT

---

LVN_ENDLABELEDIT
pdi = (LV_DISPINFO FAR *) lParam;

---

Notifies a list view control's parent window about the end of label editing for an item. This notification message is sent in the form of a WM_NOTIFY message.
No return value.
pdi
    Address of an LV_DISPINFO structure. The iItem member identifies the item, or it is −1 if editing is being canceled.

LVN_ENDRDRAG

---

LVN_ENDRDRAG
pnmv = (NM_LISTVIEW FAR *) lParam;

---

Notifies a list view control's parent window about the end of default processing for a drag-and-drop operation involving the right mouse button. This notification message is sent in the form of a WM_NOTIFY message.
No return value.
pnmv
    Address of an NM_LISTVIEW structure. The iItem member identifies the dragged item, and the ptAction member specifies the screen coordinates of the drop location. The other members are zero.

LVN_GETDISPINFO

---

LVN_GETDISPINFO
pnmv = (LV_DISPINFO FAR *) lParam;

---

Requests that a list view control's parent window provides information needed to display or sort an item. This notification message is sent in the form of a WM_NOTIFY message.
No return value.
pnmv
    Address of an LV_DISPINFO structure that specifies the type information required and that receives the information.

LVN_INSERTITEM

---

LVN_INSERTITEM
pnmv = (NM_LISTVIEW FAR *) lParam;

---

Notifies a list view control's parent window that a new item was inserted. This notification message is sent in the form of a WM_NOTIFY message.
No return value.
pnmv Address of an NM_LISTVIEW structure. The iItem member identifies the new item, and the other members are zero.

LVN_ITEMCHANGED

---

LVN_ITEMCHANGED
pnmv = (NM_LISTVIEW FAR *) lParam;

---

Notifies a list view control's parent window that an item has changed. This notification message is sent in the form of a WM_NOTIFY message.

No return value.

pnmv

Address of an NM_LISTVIEW structure that identifies the item and specifies which of its atributes have changed.

LVN_ITEMCHANGING

---

LVN_ITEMCHANGING
pnmv = (NM_LISTVIEW FAR *) lParam;

---

Notifies a list view control's parent window that an item is changing. This notification message is sent in the form of a WM_NOTIFY message.

Returns TRUE to allow the change or FALSE to prevent the change.

pnmv

Address of an NM_LISTVIEW structure that identifies the item and specifies which of its attributes are changing.

LVN_KEYDOWN

---

LVN_KEYDOWN
pnkd = (LV_KEYDOWN FAR *) lParam;

---

Notifies a list view control's parent window that a key has been pressed. This notification message is sent in the form of a WM_NOTIFY message.

No return value.

pnkd

Address of an LV_KEYDOWN structure.

LVN_SETDISPINFO

---

LVN_SETDISPINFO
pnmv = (LV_DISPINFO FAR *) lParam;

---

Notifies a list view control's parent window that it must update the information it maintains for an item. This notification message is sent in the form of a WM_NOTIFY message.

No return value.

pnmv

Address of an LV_DISPINFO structure specifying information for the changed item.

Structures

The following structures are used with list view messages and notification messages.

LV_COLUMN

---

```
typedef struct _LV_COLUMN {
    UINT mask;         // see below
    int fmt;           // see below
    int cx;            // width of the column, in pixels
    LPSTR pszText;     // see below
    int cchTextMax;    // see below
    int iSubItem:      // index of subitem associated with column
} LV_COLUMN;
```

---

Contains information about a column in report view. This structure is also used to receive information about a column.

mask

Variable specifying which members contain valid information. It can be LVCF_ALL (meaning all members), zero, or one or more of these values:

---

| | |
|---|---|
| LVCF_FMT | The fmt member is valid. |
| LVCF_SUBITEM | The iSubItem member is valid. |
| LVCF_TEXT | The pszText member is valid. |
| LVCF_WIDTH | The cx member is valid. |

--- fmt

Alignment of the column. It can be one of these values: LVCFMT_LEFT, LVCFMT_RIGHT, or LVCFMT_CENTER.

pszText

Address of a null-terminated string containing the column heading if the structure contains information about a column. If the structure is receiving information about a column, this member specifies the address of the buffer that receives the column heading.

cchTextMax

Size of the buffer pointed to by the pszText member. If the structure is not receiving information about a column, this member is ignored.

This structure is used with the LVM_GETCOLUMN, LVM_SETCOLUMN, LVM_INSERTCOLUMN, and LVM_DELETECOLUMN messages.

LV_DISPINFO

---

```
typedef struct tagLV_DISPINFO {
    NMHDR hdr; // required for all WM_NOTIFY messages
    LV_ITEM item; // see below
} LV_DISPINFO;
```

---

Contains information needed to display an owner-drawn item in a list view control.

item

LV_ITEM structure identifying the item or subitem. The structure either contains or receives information about the item. The mask member specifies which item attributes are relevant, and it can be one or more of these values:

| | |
|---|---|
| LVIF_IMAGE | The iImage member specifies, or is to receive, the index of the item's icon in the image list. |
| LVIF_STATE | The state member specifies, or is to receive, the state of the item. |
| LVIF_TEXT | The pszText member specifies the new item text or the address of a buffer that is to receive the item text. |

If the structure is receiving item text, the pszText and cchTextMax members specify the address and size of a buffer. The application programmer can either copy text to the buffer or assign the address of a string to the pszText member. In the latter case, the application programmer must not change or delete the string until the corresponding item text is deleted or two additional LVN_GETDISPINFO messages have been sent.

This structure is used with the LVN_GETDISPINFO and LVN_SETDISPINFO notification messages.

LV_FINDINFO

```
typedef struct _LV_FINDING {
    UINT flags;        //see below
    LPCSTR psz;        //see below
    LPARAM lParam;     //see below
} LV_FINDINFO;
```

Contains information used to search for a list view item.

flags

Type of search to perform. It can be one or more of these values:

| | |
|---|---|
| LVFI_NOCASE | Ignores case in string comparisons. This value is ignored if the LVFI_STRING value is not specified. |
| LVFI_PARAM | Searches based on the lParam member. The lParam member of the matching item's LV_ITEM structure must match the lParam member of this structure. If this value is specified, all other values are ignored. |
| LVFI_PARTIAL | Matches if the item text begins with the string pointed to by the psz member. This value implies use of the LVFI_STRING value, and it cannot be used with the LVFI_SUBSTRING value. |
| LVFI_STRING | Searches based on item text. Unless additional values are specified, the item text of the matching item must exactly match the string pointed to by the psz member. |
| LVFI_SUBSTRING | Matches if the string pointed to by the psz member is contained anywhere in the item text. This value implies use of the LVFI_STRING value, and it cannot be used with the LVFI_PARTIAL value. |
| LVFI_WRAP | Continues the search at the beginning if no match is found. | psz

Address of a nill-terminated string to compare with item text if the flags member specifies the LVFI_STRING, LVFI_SUBSTRING, or LVFI_PARTIAL value.

lParam

Value to compare with the lParam member of a list view item's LV_ITEM structure if the flags member specifies the LVFI_PARAM value.

This structure is used with the LVM_FINDITEM message.

LV_HITTESTINFO

```
typedef struct _LV_HITTESTINFO {
    POINT pt;      // position to hit test, in client coordinates
    UINT flags;    // see below
    int iItem;     // receives the index of the matching item
} LV_HITTESTINFO;
```

Contains information about a hit test.

flags

Variable that receives information about the results of a hit test. It can be one or more of these values:

| | |
|---|---|
| LVHT_ABOVE | The position is above the client area of the control. |
| LVHT_BELOW | The position is below the client area of the control. |
| LVHT_NOWHERE | The position is inside the list view control's client window but is not over a list item. |
| LVHT_ONITEMICON | The position is over a list view item's icon. |
| LVHT_ONITEMLABEL | The position is over a list view item's text. |
| LVHT_ONITEMSTATEICON | The position is over the state image of a list view item. |
| LVHT_TOLEFT | The position is to the left of the list view control's client area. |
| LVHT_TORIGHT | The position is to the right of the list view control's client area. |

The application programmer can use the LVHT_ABOVE, LVHT_BELOW, LVHT_TOLEFT, and LVHT_TORIGHT values to determine whether to scroll the contents of a list view control. Two of these flags may be combined, for example if the position is above and to the left of the client area.

The application programmer can test for the LVHT_ONITEM value to determine whether a given position is over a list view item. This value is a bitwise OR operation on the LVHT_ONITEMICON, LVHT_ONITEMLABEL, and LVHT_ONITEMSTATEICON values.

This structure is used with the LVM_HITTEST message.

LV_ITEM

```
typedef struct _LV_ITEM {
    UINT    mask;          // see below
    int     iItem;         // item this structure refers to
    int     iSubItem;      // subitem this refers to, or zero
    UINT    state;         // see below
    UINT    stateMask;     // see below
    LPSTR   pszText;       // see below
    int     cchTextMax;    // see below
    int     iImage;        // see below
    LPARAM  lParam;        // 32-bit value to associate with item
} LV_ITEM;
```

Specifies or receives the attributes of a list view item.

mask

Variable specifying which members contain valid data or which members are to be filled in. It can be one or more of these values:

| | |
|---|---|
| LVIF_TEXT | The pszText member is valid. |
| LVIF_IMAGE | The iImage member is valid. |
| LVIF_PARAM | The lParam member is valid. |
| LVIF_STATE | The state member is valid. | state and statemask

Current state of the item, and the valid states of the item. This member can be any valid combination of state flags.

pszText

Address of a null-terminated string containing the item text if the structure specifies item attributes. If this member is the LPSTR_TEXTCALLBACK value, the item is a callback item.

If the structure is receiving item attributes, this member is the address of the buffer that receives the item text.

cchTextMax

Size of the buffer pointed to by the pszText member if the structure is receiving item attributes. If the structure specifies item attributes, this member is ignored.

iImage

Index of the list view item's icon in the large icon and small icon image lists. If this member is the I_IMAGECALLBACK value, the item is a callback item.

This structure is used with a number of messages, including LVM_GETITEM, LVM_SETITEM, LVM_INSERTITEM, and LVM_DELETEITEM.

LV_KEYDOWN

```
typedef struct tagLV_KEYDOWN {
    NMHDR hdr;      // required for all WM_NOTIFY messages
    WORD wVKey;     // virtual-key code
    UINT flags;     // always zero
} LV_KEYDOWN;
```

Contains information about a keyboard event in a list view control.

This structure is used with the LVN_KEYDOWN notification message.

NM_LISTVIEW

```
typedef struct tagNM_LISTVIEW {
    NMHDR   hdr;        // required for all WM_NOTIFY
                        // messages
    int     iItem;      // list view item, or –1 if not used
    int     iSubItem;   // subitem, or zero if none
    UINT    uNewState;  // see below
    UINT    uOldState;  // see below
    UINT    uChanged;   // see below
    POINT   ptAction;   // see below
} NM_LISTVIEW;
```

Contains information about a list view notification message.

uNewState and uOldState

New item state, and the old item state. Both members are zero for notification messages that do not use them.

uChanged

Item attributes that have changed. This member is zero for notifications that do not use it. Otherwise, it can have the same values as the mask member of the LV_structure.

ptAction

Location at which the event occurred. This member is valid only for the LVN_BEGINDRAG and LVN_BEGINRDRAG notification messages.

The address of this structure is specified as the lParam parameter of the WM_NOTIFY message for several list view notification messages.

Constants

The tables in the following sections describe window style flags and item state flags used with list view controls.

List View Window Styles

The following window styles are specific to list view controls:

| | |
|---|---|
| LVS_ALIGNBOTTOM | Specifies that items are aligned along the bottom of the control in icon and small icon view. |
| LVS_ALIGNLEFT | Specifies that items are left-aligned in icon and small icon view. |
| LVS_ALIGNRIGHT | Specifies that items are right-aligned in icon and small icon view. |
| LVS_ALIGNTOP | Specifies that items are aligned with the top of the control in icon and small icon view. |
| LVS_AUTOARRANGE | Specifies that icons are automatically kept arranged in icon view and small icon view. |
| LVS_BUTTON | Specifies that item icons look like buttons in large icon view. |
| LVS_EDITLABELS | Allows item text to be edited in place. The parent window must process the LVN_ENDLABELEDIT notification message. |
| LVS_ICON | Specifies icon view. |
| LVS_LIST | Specifies list view. |
| LVS_NOCOLUMNHEADER | Specifies that a column header is not displayed in report view. By default, columns have headers in report view. |
| LVS_NOITEMDATA | Allocates only enough space to store the state of each item, not the label, icon, subitem strings, or application-defined data. The parent window must process the LVN_GETDISPINFO notification message to provide this information to the list view control on demand. |
| LVS_NOLABELWRAP | Displays item text on a single line in icon view. By default, item text may wrap in icon view. |
| LVS_NOSCROLL | Disables scrolling. All items must be within the client area. |
| LVS_NOSORTHEADER | Specifies that column headers do not work like buttons. This style is useful if clicking a column header in report view does not carry out an action, such as sorting. |
| LVS_OWNERDRAWFIXED | Enables the owner window to paint items in report view. The list view control sends a WM_DRAWITEM message to paint each item; it does not send separate messages for each subitem. The itemData member of the DRAWITEMSTRUCT structure contains the item data for the specified list view item. |
| LVS_REPORT | Specifies report view. |
| LVS_SHAREIMAGELISTS | Specifies that the control does not take ownership of the image lists assigned to it (that is, it does not destroy the image lists when it is destroyed). This style enables the same image lists to be used with multiple list view controls. |
| LVS_SINGLESEL | Allows only one item at a time to be selected. By default, multiple items may be selected. |
| LVS_SMALLICON | Specifies small icon view. |
| LVS_SORTASCENDING | Sorts items based on item text in ascending order. |
| LVS_SORTDESCENDING | Sorts items based on item text in descending order. |

The application programmer can use the LVS_TYPESTYLEMASK value to isolate the window styles that correspond to the current view: LVS_ICON, LVS_SMALLICON, LVS_LIST, and LVS_REPORT.

The application programmer can use the LVS_ALIGNMASK value to isolate the window styles that specify the alignment of items: LVS_ALIGNLEFT, LVS_ALIGNRIGHT, LVS_ALIGNBOTTOM, and LVS_ALIGNTOP.

List View Item States

An item's state determines its appearance and functionality. The state can be zero, or one or more of these values:

| | |
|---|---|
| LVIS_CUT | The item is marked for a cut or move operation. |
| LVIS_DISABLED | The item is disabled, so it is drawn using the standard disabled style and coloring. |
| LVIS_DROPHILITED | The item is highlighted as a drag-and-drop target. |
| LVIS_FOCUSED | The item has the focus, so it is surrounded by a standard focus rectangle. Although more than one item may be selected, only one item can have the focus. |
| LVIS_HIDDEN | The item is not visible, so it cannot be acted on by the user. |
| LVIS_LINK | The item is a link. |
| LVIS_PUSHED | The button-like item appears pushed. This value has no effect unless the LVS_BUTTON window style is used. |
| LVIS_SELECTED | The item is selected. The appearance of a selected item depends on whether it has the focus and on the system colors used for selection. |

The application programmer can use the LVIS_OVERLAYMASK value to isolate the state bits that contain the one-based index of the overlay image. The application programmer can use the LVIS_STATEIMAGEMASK value to isolate the state bits that contain the one-based index of the state image.

Discussion of Figures

FIG. 1 is a block diagram of various of the hardware and software components of a contemporary computer system 10 with which the present invention can be employed. Among the hardware components 12 are the CPU 14, a memory 16, a disk drive 18, and a variety of peripheral devices 20. Among the software components are the operating system 22, one or more applications 24, and several device drivers 26.

Applications 24 and the operating system 22 communicate via the Applications Program Interfaces (APIs) 28. As noted, these are the special instructions by which the applications 24 request services of (or through) the operating system 22. Associated with most APIs are various sets of parameters, through which data relating to the requested service is passed between the application and the operating system. (Although not shown separately, the applications and operating system also communicate via "messages" and "macros" (also referred to herein as "APIs"). Generally speaking, messages relay data between different components of the computer system (including applications programs, the operating system, and various data structures maintained by the operating system such as windows). Macros are generally comparable to API service requests, but pass their parameters using different data structures. Many operating system services can be requested by either an API or by a macro.)

Related to APIs are DDIs. DDIs (Device Driver Interfaces) 30 are instruction by which the operating system 22 requests services from a hardware device 20 through its device driver 26. For the sake of brevity, DDIs and the responses thereto are also regarded as "APIs" as used herein.

As noted above and illustrated in FIG. 1, applications 24 can communicate directly with the hardware 12 by use of assembly language 32. (For clarity of illustration, the assembly lanuage instructions in FIG. 1 are shown as applied directly to the hardware. Actually, the instructions are processed by the operation system prior to execution by the hardware.)

FIG. 2 is a more detailed block diagram of the hardware components 12 of the computer system 10 illustrated in FIG. 1. The hardware includes a computer 34, one or more input devices 36, and one or more output devices 38.

The illustrated computer 34 includes a central processing unit (CPU) 14 and a memory system 40 that communicate through a bus structure 42. CPU 14 includes an arithmetic logic unit (ALU) 44 for performing computations, registers 46 for temporary storage of data and instructions, and a control unit 48 for controlling the operation of computer in response to software instructions.

Memory system 40 generally includes high-speed main memory 16 in the form of random access memory (RAM) and read only memory (ROM) semiconductor devices. Main memory 16 stores software such as the operating system 22, device drivers 26, and currently running applications 24. Main memory 16 also includes video display memory for displaying images through a display device. Memory system 40 further includes secondary storage 18 in the form of floppy disks, hard disks, tape, CD-ROM, etc., for long term data storage.

Input devices 36 and output devices 38 are typically peripheral devices connected by bus structure 42 to computer 34. Input devices 36 can include a keyboard, modem, pointing device, pen, or other device for providing input data to the computer. Output devices 38 can include a display device, printer, sound device or other device for providing output data from the computer.

It should be understood that FIG. 2 illustrates the basic elements of a general purpose computer system; the figure is not intended to illustrate a specific architecture. For example, no particular bus structure is shown because different known bus structures can be used to interconnect the elements of the computer system in a number of ways, as desired. CPU 14 can comprise a discrete ALU 44, registers 46 and control unit 48, or can be a single device in which these parts of the CPU are integrated together, such as in a microprocessor. (The illustrated embodiment employs an Intel 80486 microprocessor, but a variety of other microprocessors can alternatively be used.) Moreover, the number and arrangement of the elements of the computer system can be varied from what is shown and described in ways known in the art (i.e., multiple CPUs, client-server systems, computer networking, etc.).

The APIs 28 used in the Microsoft Windows 95 operating system are a superset of those used in predecessor Microsoft Windows operating systems (e.g. Microsoft Windows 3.1, Windows for Workgroups, and Windows NT). The use of Microsoft Windows, and particularly the use of Microsoft Windows APIs in writing applications programs and device drivers, is well understood by those skilled in the art, and is abundantly detailed in the published literature, including the following (each published by Microsoft Press, One Microsoft Way, Redmond, Wash. 98052-6399): King, Adrian, "Inside Windows 95," ISBN 1-55615-626-X, 1994; "The Developer's Guide to Plug 'n Play: The Official Guide to Designing Hardware for Windows," ISBN 1-55615-642-1, 1994; Catapult, Inc. Staff "Microsoft Windows NT Workstation Step by Step," ISBN 1-55615-695-2, 1994; Jamsa, Chris, "Concise Guide to Windows, 2d ed." ISBN 1-55615-

666-9, 1994; "Windows NT Resource Guide, Vol. 1," ISBN 1-55615-653-7, 1994; "Windows NT Network Resource Guide, Vol. 2," ISBN 1-55615-656-1, 1994; "Windows NT Messages, Vol. 3," ISBN 1-55615-654-5, 1994; "Optimizing Windows NT, Vol. 4," ISBN 1-55615-655-3, 1994; "Microsoft Windows NT Resource Kit: The Information & Tools You Need to Become a Windows NT Expert, Version 3.5 for Workstation & Advanced Server Editions, 2d. ed." (4 vols.) ISBN 1-55615-657-X 1994; "Microsoft ODBC 2.0 Programmer's Reference & SDK Guide: For Microsoft Windows & Windows NT," ISBN 1-55615-658-8, 1994; Custer, Helen, "Inside the Windows NT File System," ISBN 1-55615-660-X, 1994; Nelson, Steve, "Field Guide to Windows 3.1," ISBN 1-55615-640-5, 1994; Catapult Inc. Staff; "Microsoft Windows NT Step by Step," ISBN 1-55615-573-5, 1993; Blake, Russ, "Optimizing Windows NT," ISBN 1-55615-619-7, 1993; Richter, Jeffrey, "Advanced Windows NT," ISBN 1-55615-567-0, 1993; Stinson, Craig, "Running Windows NT,"

Belfiore, Joseph "Method and System for Transferring Data to Common Destinations Using a Common Destination List," U.S. Pat. No. 5,694,563, Issued Dec. 2, 1997 and Filed Dec. 13, 1994;

Bogdan, Jeffrey L., "System Provided Window Elements Having Adjustable Dimensions," U.S. Pat. No. 5,977,966, Issued Nov. 2, 1999 and Filed Apr. 28, 1993;

Chew, Chee Heng, "System Provided Child Window Controls," Ser. No. 08/355,400, Filed Dec. 13, 1994, now abandoned;

Chew, Chee Heng, "Method and System for Combining Prefix and First Character Searching of a List," U.S. Pat. No. 5,692,173, Issued Nov. 25. 1997 and Filed Dec. 13, 1994;

Ellison-Taylor, Ian M., "Method and System for Aligning Windows on a Screen," Ser. No. 08/161,788, Filed Dec. 12, 1993, now abandoned;

Ellison-Taylor, Ian M., "Taskbar With Start Menu," Ser. No. 08/354,916, Filed Dec. 13, 1994, now abandoned;

Glasser, Daniel S., "Method and System for Controlling User Access to a Resource in a Networked Computing Environment," Ser. No. 08/355,409, Filed Dec. 13, 1994, now abandoned;

Guzak, Christopher J., "Tree View Control," Ser. No. 08/355,408, Filed Dec. 13, 1994, now abandoned;

Guzak, Christopher J., "Data Transfer With Expanded Clipboard Formats," Ser. No. 08/355,397, Filed Dec. 13, 1994, now abandoned;

Jones, Greg, "Method and System for Accessing Shell Folder Capabilities by an Application Program," Ser. No. 08/356,081, Filed Dec. 13, 1994, now abandoned;

Jones, Greg, "Method and System for Authenticating Access to Heterogeneous Computing Services," U.S. Pat. No. 5,655,077, Issued Aug. 5, 1997 and Filed Dec. 13, 1994;

Kanamori, Atsushi, "Method and System for Providing a Group of Parallel Resources as a Proxy for a Single Shared Resource," U.S. Pat. No. 5,754,854. Issued May 5, 1998 and Filed Nov. 14, 1994;

Kanamori, Atsushi, "Method and System for Threaded Resource Allocation and Reclamation," U.S. Pat. No. 6,363,410, Issued Mar. 26, 2002 and Filed Dec. 13, 1994;

Lipe, Ralph A., "Method and Apparatus for Installing Device Drivers on a Computer," Ser. No. 08/271,058, Filed Jul. 5, 1994, now abandoned;

Lipe, Ralph A., "Computer System Messaging Architecture," U.S. Pat. No. 5,784,615, Issued Jul. 21, 1998 and Filed Dec. 13, 1994;

Mabry, Jonathon E., "Automatic Installation of Printers in a Distributed Environment," Ser. No. 08/318,070, Filed Oct. 5, 1994, now abandoned;

Moore, George M., "Method and System for Providing Substitute Computer Fonts," Ser. No. 08/085,482, Filed Jun. 30, 1993, now abandoned;

Nakajima, Satoshi, "Shell Extensions for an Operating System," U.S. Pat. No. 5,831,606, Issued Nov. 3, 1998 and Filed Dec. 13, 1994;

Nixon, Toby L., "Method and System for Determining Control of a Telephone Communication Among Multiple Application Programs," Ser. No. 08/318,989, Filed Oct. 6. 1994, now abandoned;

Oran, Daniel P., "Operating System Provided Notification Area for Displaying Visual Notifications from Application Programs," U.S. Pat. No. 5,617,526, Issued Apr. 1, 1997 and Filed Dec. 13, 1994;

Parry, William G., "Improved Method and Apparatus for Controlling Power Down of a Hard Disk Drive in a Computer," U.S. Pat. No. 5,574,920, Issued Nov. 12, 1996 and Filed Oct. 25, 1994;

Patrick, Stuart R., "Method and Apparatus for Creating and Performing Graphics Operations on Device-Independent Bitmaps," U.S. Pat. No. 5,734,387, Issued Mar. 31, 1998 and Filed Oct. 24, 1994;

Patrick, Stuart R., "Run-time Code Compiler for Data Block Transfer," U.S. Pat. No. 5,706,483, Issued Jan. 6, 1998 and Filed Dec. 13, 1994;

Patrick, Stuart R., "Method and Apparatus for Creating and Transferring a Bitmap" U.S. Pat. No. 5,659,336, Issued Aug. 19, 1997 and Filed Oct. 24, 1994;

Patrick, Stuart R., "Bitmap Block Transfer Image Conversion," U.S. Pat. No. 5,644,758, Issued Jul. 1, 1997 and Filed Dec. 13, 1994;

Radko, Ron, "Providing Applications Programs with Unmediated Access to a Contested Hardware Resource," U.S. Pat. No. 5,901,312, Issued May, 4, 1999 and Filed Dec. 13, 1994;

Richman, Darryl, "Method for Automatically Configuring Devices including a Network Adapter without Manual Intervention and without Prior Configuration Information" U.S. Pat. No. 5,655,148, Issued Aug. 5, 1997 and Filed Dec. 13, 1994;

Sadovsky, "Method and for Providing Access to Independent Network Resources by Establishing Connection Using an Application Programming Interface Function Call Without Prompting the User for Authentication Data," U.S. Pat. No. 5,689,638, Issued Nov. 18, 1997 and Filed Dec. 13, 1994;

Smale, Leonard T., "Notification Mechanism for Coordinating Software Extensions," Ser. No. 08/354,630, Filed Dec. 13, 1994, now abandoned;

Veghte, William L., "Method and System for Connecting to Browsing and Accessing Computer Network Resources," U.S. Pat. No. 5,953,012, Issued Sep. 14, 1999 and Filed Dec. 13, 1994;

Williams, Robert J., "Device Independent Modem Interface," U.S. Pat. No. 5,815,682, Issued Sep. 29, 1998 and Filed Dec. 13, 1994;

Williams, Robert J., "Method and Apparatus for Maintaining Network Communications on a Computer Capable of Connecting to a WAN and a LAN," U.S. Pat. No. 5,659,685, Issued Aug. 19, 1997 and Filed Dec. 13, 1994;

Forming a part of the present specification is SDK/DDK documentation made available by Microsoft to third party developers to enable them to utilize the claimed APIs (as published by Microsoft on Oct. 28, 1994). Due to its length, such documentation is not printed as part of the present but is made of record in the application file on CD-ROM form.

This documentation includes the following files:

WIN95\SDK\CCTL32_1.DOC
WIN95\SDK\CCTL32_2.DOC
WIN95\SDK\GDI32_1.DOC
WIN95\SDK\GDI32_2.DOC
WIN95\SDK\GUIDE_1.DOC
WIN95\SDK\GUIDE_2.DOC
WIN95\SDK\INTL32.DOC
WIN95\SDK\INTRO32.DOC
WIN95\SDK\JPEG.DOC
WIN95\SDK\KRNL32_1.DOC
WIN95\SDK\KRNL32_2.DOC
WIN95\SDK\KRNL32_3.DOC
WIN95\SDK\MISC32.DOC
WIN95\SDK\MM32_1.DOC
WIN95\SDK\MM32_2.DOC
WIN95\SDK\MM32_3.DOC
WIN95\SDK\MM32_4.DOC
WIN95\SDK\OLERNOTE.DOC
WIN95\SDK\RNASPI.DOC
WIN95\SDK\SYSPOL.DOC
WIN95\SDK\USER32_1.DOC
WIN95\SDK\USER32_2.DOC
WIN95\SDK\USER32_3.DOC
WIN95\SDK\USER32_4.DOC
WIN95\SDK\WIN32UPD.DOC
WIN95\DDK\BLOCK.DOC
WIN95\DDK\CHICIFS.DOC
WIN95\DDK\DISPLAY.DOC
WIN95\DDK\EDITAPIF.DOC
WIN95\DDK\GRAPHICS.DOC
WIN95\DDK\IMEDLL.DOC
WIN95\DDK\KEYBOARD.DOC
WIN95\DDK\MOUSE.DOC
WIN95\DDK\NETWORK2.DOC
WIN95\DDK\PENDRV.DOC
WIN95\DDK\PNP.DOC
WIN95\DDK\STDVXD.DOC
WIN95\DDK\VCOMM.DOC
WIN95\DDK\VMM.DOC
WIN95\DDK\WNASPI32.DOC

We claim:

1. A computer system including a microprocessor and a software program, the software program utilizing an application program interface to request services from a windowed operating system, the requested services relating to display, manipulation or arrangement of items in a window, which items may include text associated therewith, the application program interface including a separate command to request each of the following services:

arranging the items in an icon view;
creating a drag image list for a specified item;
removing all items from the window;
removing a column of items from the window;
removing an item from the window;
beginning in-place editing of text associated with a specified item;
ensuring that an item is entirely or at least partially visible, scrolling a window control if necessary;
searching for an item with specified characteristics;
retrieving a background color of the window;
retrieving a callback mask for the window;
retrieving attributes of a window column;
retrieving a width of a column in the window;
calculating a number of items that can fit vertically in a visible area of the window;
retrieving a handle of an edit control being used to edit an item's text;
retrieving a handle of an image list used for drawing items;
retrieving some or all of an item's attributes;
retrieving a number of items in the window;
retrieving a position of an item in the window;
retrieving a bounding rectangle for all or part of an item in a current view of the window;
retrieving a state of an item;
retrieving text associated with an item;
searching for an item that has specified properties and that bears a specified relationship to a given item;
retrieving a current view origin for the window;
determining a minimum column width necessary to display all of a given string;
retrieving a text background color of a window;
retrieving a text color of a window;
retrieving an index to a topmost visible item in the window;
retrieving a bounding rectangle of all items in the window;
determining which item, if any, is at a specified position;
inserting a new column in a window;
inserting a new item in a window;
forcing a window to repaint a range of items;
scrolling contents of a window;
setting a background color of the window;
setting a callback mask for a window;
setting attributes of a window column;
changing a width of a window column;
assigning an image list to a window;
setting some or all of an item's attributes;
preparing a window for adding items;
moving an item to a specified position in the window;
changing a state of an item in the window;
changing text associated with an item;
setting a background color of text in the window;
setting a text color of a window;
sorting items using an application-defined comparison function; and
updating an item.

2. The computer system of claim 1 in which said separate commands all belong to a common class of commands.

3. In a computer-based method of running a software program on a computer, the computer operating under an operating system that provides a windowed display of graphical items, at least some of said items having text associated therewith, the method including issuing instructions from the software program requesting at least ten of the following functions from the operating system, each instruction corresponding to only one of said functions:

arranging the items in an icon view;
creating a drag image list for a specified item;
removing all items from the window;
removing a column of items from the window;
removing an item from the window;
beginning in-place editing of text associated with a specified item;

ensuring that an item is entirely or at least partially visible, scrolling a window control if necessary;

searching for an item with specified characteristics;

retrieving a background color of the window;

retrieving a callback mask for the window;

retrieving attributes of a window column;

retrieving a width of a column in the window;

calculating a number of items that can fit vertically in a visible area of the window;

retrieving a handle of an edit control being used to edit an item's text;

retrieving a handle of an image list used for drawing items;

retrieving some or all of an item's attributes;

retrieving a number of items in the window;

retrieving a position of an item in the window;

retrieving a bounding rectangle for all or part of an item in a current view of the window;

retrieving a state of an item;

retrieving text associated with an item;

searching for an item that has specified properties and that bears a specified relationship to a given item;

retrieving a current view origin for the window;

determining a minimum column width necessary to display all of a given string;

retrieving a text background color of a window;

retrieving a text color of a window;

retrieving an index to a topmost visible item in the window;

retrieving a bounding rectangle of all items in the window;

determining which item, if any, is at a specified position;

inserting a new column in a window;

inserting a new item in a window;

forcing a window to repaint a range of items;

scrolling contents of a window;

setting a background color of the window;

setting a callback mask for a window;

setting atributes of a window column;

changing a width of a window column;

assigning an image list to a window;

setting some or all of an item's attributes;

preparing a window for adding items;

moving an item to a specified position in the window;

changing a state of an item in the window;

changing text associated with an item;

setting a background color of text in the window;

setting a text color of a window;

sorting items using an application-defined comparison function; and updating an item.

4. The method of claim 3 in which said instructions all belong to a common class of instructions.

5. A method of invoking display of a collection of graphical items in an information handling system having a central processing unit and a display device, the central processing unit being controlled by an operating system and having one or more software programs that performs output operation to the display device, said method being performed by an application program interface communicating between said software program and said operating system, including the steps:

issuing a call from the software program to the operating system requesting creation of a list view window;

receiving, by the software program, a handle to the window thereby created;

storing said handle for future reference;

sending a message to the window by use of said handle, the message having the form:

LVM_ARRANGE wParam=code;

lParam=0;

where code is a parameter selected from a group comprising: LVA_ALIGNBOTTOM, LVA_ALIGNLEFT, LVA_ALIGNRIGHT, LVA_ALIGNTOP, LVA_DEFAULT, and LVA_SNAPTOGRID.

6. The method of claim 5 which further includes sending a plurality of further messages to said window by reference to said handle, said further messages being selected from the group comprising: LV_ITEM, LVM_DELETEALLITEMS, LVM_DELETEITEM, LVM_GETITEM, LVM_GETITEMCOUNT, LVM_GETITEMSTATE, LVM_GETITEMTEXT, LVM_INSERTITEM, LVM_SETITEM, LVM_SETITEMCOUNT, LVM_SETITEMSTATE, LVM_SETITEMTEXT, LV_DISPINFO, LVM_GETCALLBACKMASK, LVM_REDRAWITEMS, LVM_SETCALLBACKMASK, LVM_UPDATE, LVN_GETDISPINFO, LVN_SETDISPINFO, LV_COLUMN, LVM_DELETECOLUMN, LVM_GETCOLUMN, LVM_GETCOLUMNWIDTH, LVM_GETSTRINGWIDTH, LVM_INSERTCOLUMN, LVM_SETCOLUMN, LVM_SETCOLUMNWIDTH, LVN_COLUMNCLICK, LV_FINDINFO, LVM_FINDITEM, LVM_GETNEXTITEM, LVM_SORTITEMS, LV_HITTESTINFO, LVM_ENSUREVISIBLE, LVM_GETCOUNTPERPAGE, LVM_GETITEMPOSITION, LVM_GETITEMRECT, LVM_GETORIGIN, LVM_GETTOPINDEX, LVM_GETVIEWRECT, LVM_HITTEST, LVM_SCROLL, LVM_SETITEMPOSITION, LVM_GETBKCOLOR, LVM_GETTEXTBKCOLOR, LVM_GETTEXTCOLOR, LVM_SETBKCOLOR, LVM_SETTEXTBKCOLOR, LVM_SETTEXTCOLOR, LVM_KEYDOWN, LVM_CREATEDRAGIMAGE, LVM_EDITLABEL, LVM_GETEDITCONTROL, LVM_GETIMAGELIST, LVM_SETIMAGELIST, LVN_BEGINDRAG, LVN_BEGINLABELEDIT, LVN_BEGINRDRAG, LVN_DELETEALLITEMS, LVN_DELETEITEM, LVN_ENDDRAG, LVN_ENDLABELEDIT, LVN_ENDRDRAG, LVN_INSERTITEM, LVN_ITEMCHANGED, LVN_ITEMCHANGING, and LVN_KEYDOWN.

7. A computer-implemented method for interfacing a plurality of software programs to an operating system comprising computer implemented steps of:

providing a set of application program interfaces, each responsive to program calls from said software programs;

generating a call from one of said application program interfaces to the operating system in response to one of said program calls, said call requesting establishment of a window of a ListView class; and passing one of a predefined set of "LVM_" messages from the software program to a list view control.

8. A computer system comprising:
   at least one application program including a set of program calls, each of said calls being related to a specific operating system operation, said set of program calls including a call requesting establishment of a window of a ListView class;
   an operating system exposing a set of application programs interfaces, each corresponding to a program call from said application program, and including a message from the application program to a list view control, the message having an "LVN_" or "LVM_" prefix.

9. A machine having a memory which contains a plurality of list view controls invoked by a software program, the invocation including the following steps:
   instructing an operating system to load a common controls dynamic link library;
   calling an application program interface for creating a window of a ListView class;
   receiving and storing a window handle returned to the software program in response to said call; and
   issuing messages to the operating system relating to manipulation of said window, said messages referring to said window handle.

10. The method of claim 9 in which the messages request the operating system to perform only actions selected from the following list with respect to arrangement and display of graphical items in the list view control window:
   arranging the items in an icon view;
   creating a drag image list for a specified item;
   removing all items from the window;
   removing a column of items from the window;
   removing an item from the window;
   beginning in-place editing of a text associated with a specified item;
   ensuring that an item is entirely or at least partially visible, scrolling a window control if necessary;
   searching for an item with specified characteristics;
   retrieving a background color of the window;
   retrieving a callback mask for the window,
   retrieving attributes of a window column;
   retrieving a width of a column in the window;
   calculating a number of items that can fit vertically in a visible area of the window;
   retrieving a handle of an edit control being used to edit an item's text;
   retrieving a handle of an image list used for drawing items;
   retrieving some or all of an item's attributes;
   retrieving a number of items in the window,
   retrieving a position of an item in the window;
   retrieving a bounding rectangle for all or part of an item in a current view of the window;
   retrieving a state of an item;
   retrieving text associated with an item;
   searching for an item that has specified properties and that bears a specified relationship to a given item;
   retrieving a current view origin for the window;
   determining a minimum column width necessary to display all of a given string;
   retrieving a text background color of a window;
   retrieving a text color of a window;
   retrieving an index to a topmost visible item in the window;
   retrieving a bounding rectangle of all items in the window;
   determining which item, if any, is at a specified position;
   inserting a new column in a window;
   inserting a new item in a window;
   forcing a window to repaint a range of items;
   scrolling contents of a window;
   setting a background color of the window;
   setting a callback mask for a window;
   setting attributes of a window column;
   changing a width of a window column;
   assigning an image list to a window;
   setting some or all of an item's attributes;
   preparing a window for adding items;
   moving an item to a specified position in the window;
   changing a state of an item in the window;
   changing text associated with an item;
   setting a background color of text in the window;
   setting a text color of a window;
   sorting items using an application-defined comparison function; and
   updating an item.

* * * * *